(12) United States Patent
Salmon et al.

(10) Patent No.: US 11,809,832 B2
(45) Date of Patent: *Nov. 7, 2023

(54) NATURAL LANGUAGE TEXT GENERATION USING SEMANTIC OBJECTS

(71) Applicant: YSEOP SA, Lyons (FR)

(72) Inventors: Raphaël François André Salmon, Lyons (FR); Alain Kaeser, Paris (FR); Bernard Paul Rémy Légaut, Bogota (CO)

(73) Assignee: YSEOP SA, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,047

(22) Filed: Aug. 18, 2022

(65) Prior Publication Data

US 2022/0398386 A1 Dec. 15, 2022

Related U.S. Application Data

(63) Continuation of application No. 16/868,685, filed on May 7, 2020, now Pat. No. 11,449,687.

(60) Provisional application No. 62/846,356, filed on May 10, 2019.

(51) Int. Cl.
*G06F 40/56* (2020.01)
*G06F 40/30* (2020.01)
*G06F 40/274* (2020.01)

(52) U.S. Cl.
CPC ............ *G06F 40/56* (2020.01); *G06F 40/274* (2020.01); *G06F 40/30* (2020.01)

(58) Field of Classification Search
None
See application file for complete search history.

(56) References Cited

U.S. PATENT DOCUMENTS

| | | |
|---|---|---|
| 7,412,385 B2 | 8/2008 | Brockett et al. |
| 7,546,235 B2 | 6/2009 | Brockett et al. |
| 7,552,046 B2 | 6/2009 | Brockett et al. |
| 7,584,092 B2 | 9/2009 | Brockett et al. |
| 8,204,842 B1 | 6/2012 | Zhang et al. |

(Continued)

OTHER PUBLICATIONS

International Search Report and Written Opinion for International Application No. PCT/IB2020/000359 dated Sep. 15, 2020.

(Continued)

*Primary Examiner* — Douglas Godbold
(74) *Attorney, Agent, or Firm* — Wolf, Greenfield & Sacks, P.C.

(57) ABSTRACT

Techniques for generating natural language text with a natural language generation (NLG) system using a plurality of semantic objects including a first semantic object. The techniques include: obtaining a first specification of the first semantic object, the first specification specifying a first set of one or more data variables, first attributes, a first vocabulary, and a first document structure configuration; obtaining, from at least one data store, first data related to the first set of data variables; determining values of at least some of the first set of data variables using the first data; generating the natural language text including first natural language text, using the first specification, the values of at least some of the first set of data variables; and outputting the generated natural language text.

19 Claims, 20 Drawing Sheets

(56) References Cited

U.S. PATENT DOCUMENTS

| | | | |
|---|---|---|---|
| 8,825,474 | B1 | 9/2014 | Zhai et al. |
| 9,135,244 | B2 | 9/2015 | Reiter |
| 9,223,497 | B2 | 12/2015 | Pasquero et al. |
| 9,996,524 | B1 | 6/2018 | Hwang et al. |
| 10,339,470 | B1 | 7/2019 | Dutta et al. |
| 10,943,072 | B1 | 3/2021 | Jaganmohan |
| 11,210,473 | B1 | 12/2021 | Mariko et al. |
| 11,449,687 | B2 * | 9/2022 | Salmon ............... G06F 40/274 |
| 2006/0009966 | A1 | 1/2006 | Johnson et al. |
| 2006/0245641 | A1 | 11/2006 | Viola et al. |
| 2007/0055491 | A1 | 3/2007 | Manson et al. |
| 2009/0287476 | A1 | 11/2009 | Johnson et al. |
| 2011/0184727 | A1 | 7/2011 | Connor |
| 2014/0108304 | A1 * | 4/2014 | Heidasch ............... G06F 40/30 706/12 |
| 2014/0156264 | A1 | 6/2014 | Etzioni et al. |
| 2014/0188891 | A1 | 7/2014 | Nath et al. |
| 2014/0310639 | A1 | 10/2014 | Zhai et al. |
| 2015/0089409 | A1 | 3/2015 | Asseily et al. |
| 2015/0169547 | A1 * | 6/2015 | Reiter ............... G06F 40/131 704/9 |
| 2016/0364377 | A1 * | 12/2016 | Krishnamurthy ....... G06F 40/35 |
| 2017/0357636 | A1 | 12/2017 | Shafiulla et al. |
| 2018/0032505 | A1 * | 2/2018 | Hoetzer ............... G06Q 10/10 |
| 2018/0143956 | A1 | 5/2018 | Skarbovsky et al. |
| 2018/0217976 | A1 | 8/2018 | Hwang et al. |
| 2018/0300311 | A1 * | 10/2018 | Krishnamurthy ....... G06F 40/56 |
| 2019/0311039 | A1 | 10/2019 | Plant et al. |
| 2020/0057798 | A1 | 2/2020 | Ragan, Jr. et al. |
| 2020/0184959 | A1 | 6/2020 | Yasa et al. |
| 2020/0201897 | A1 | 6/2020 | Palanciuc et al. |
| 2020/0233928 | A1 * | 7/2020 | Hane ............... G06F 40/30 |
| 2020/0356732 | A1 | 11/2020 | Salmon et al. |
| 2020/0380075 | A1 | 12/2020 | Boada et al. |
| 2020/0410011 | A1 | 12/2020 | Shi et al. |

OTHER PUBLICATIONS

Danlos et al., EasyText: an operational NLG system. Proceedings of the 13th European Workshop on Natural Language Generation (ENLG). 2011:139-144.

Jäger et al., Formal language theory: refining the Chomsky hierarchy. Philosophical Transactions of the Royal Society B: Biological Sciences. Jul. 19, 2012;367(1598):1956-70.

Lafferty et al., Conditional random fields: Probabilistic models for segmenting and labeling sequence data. Proceedings of the Eighteenth International Conference on Machine Learning (ICML). 2001:282-289.

Oard et al., Implicit feedback for recommender systems. Proceedings of the AAAI workshop on recommender systems. Jul. 27, 1998;83:3 pages.

Reinanda et al., Performance Comparison of Learning to Rank Algorithms for Information Retrieval. 2014 International Conference on Information, Communication Technology and System. 2014:3 pages. https://www.semanticscholar.org/paper/Performance-Comparison-of-Learning-to-Rank-for-Reinanda-Widyantoro/cd12e191d2c2790e5ed60e5186462e6f8027db1f?citingPapersSort=relevance&citingPapersLimit=10&citingPapersOffset=0&year%5B0%5D=&year%5B1%5D=&citedPapersSort=relevance&citedPapersLimit=10&citedPapersOffset=10#paper-header [last accessed Sep. 4, 2020].

Reiter, Has a consensus NL generation architecture appeared, and is it psycholinguistically plausible?. ArXiv preprint cmp-lg/9411032. Nov. 30, 1994:1-9.

Roche et al., Finite-state language processing. MIT press. 1997. 474 pages.

Silberztein, Syntactic parsing with NooJ. HAL archives-ouvertes. Jul. 6, 2010:1-14.

Vaswani et al., Attention is all you need. ArXiv preprint arXiv:1706.03762v5. Dec. 6, 2017;5:1-15.

* cited by examiner

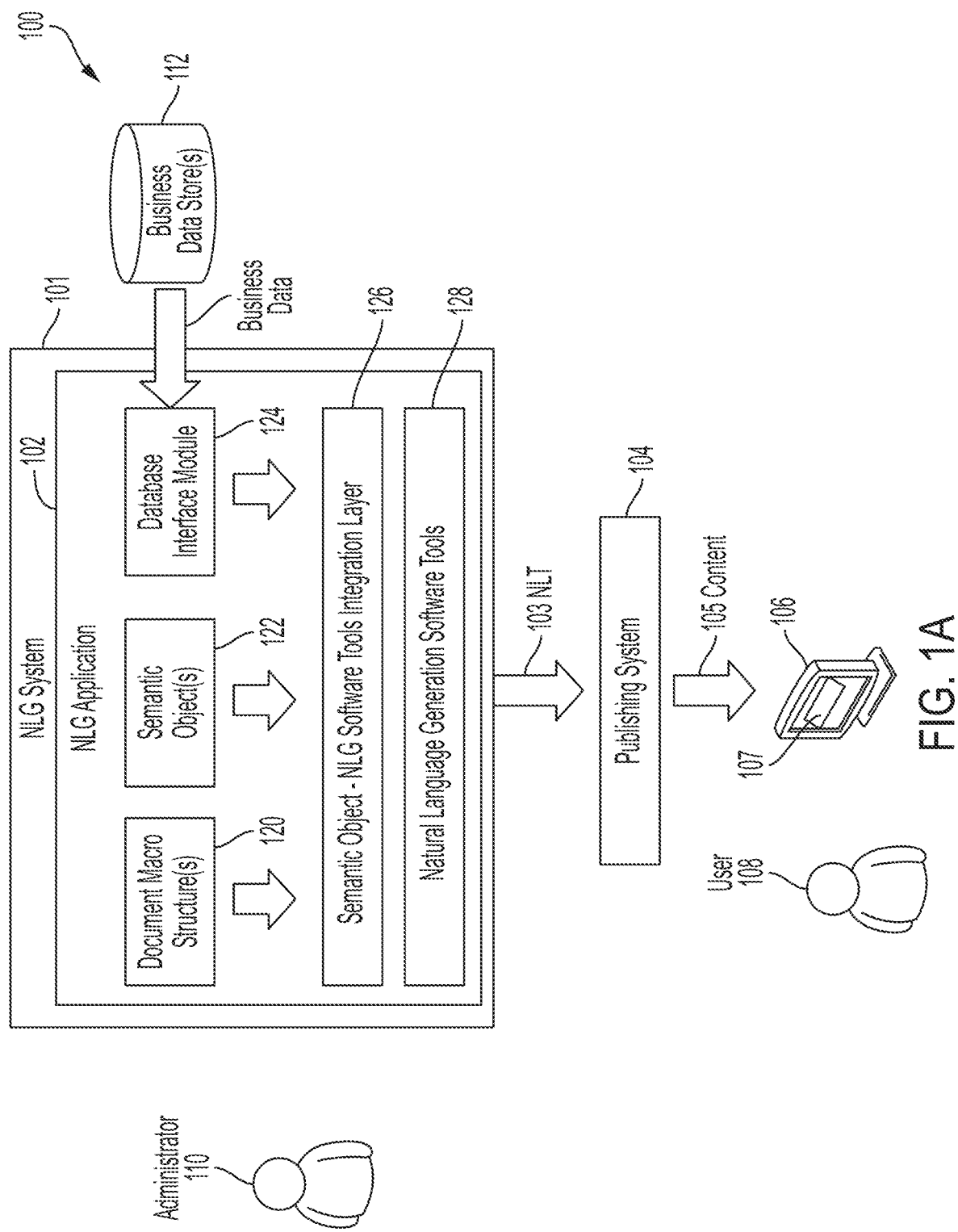

CAUSE(
    VARIATION_INTENSITY (VARIATION ...) — 240
    VARIATION_INTENSITY (VARIATION ...)
)

FIG. 2E

• As a result of the increase in costs in 2018, benefits declined during the same period. — 242

FIG. 2F

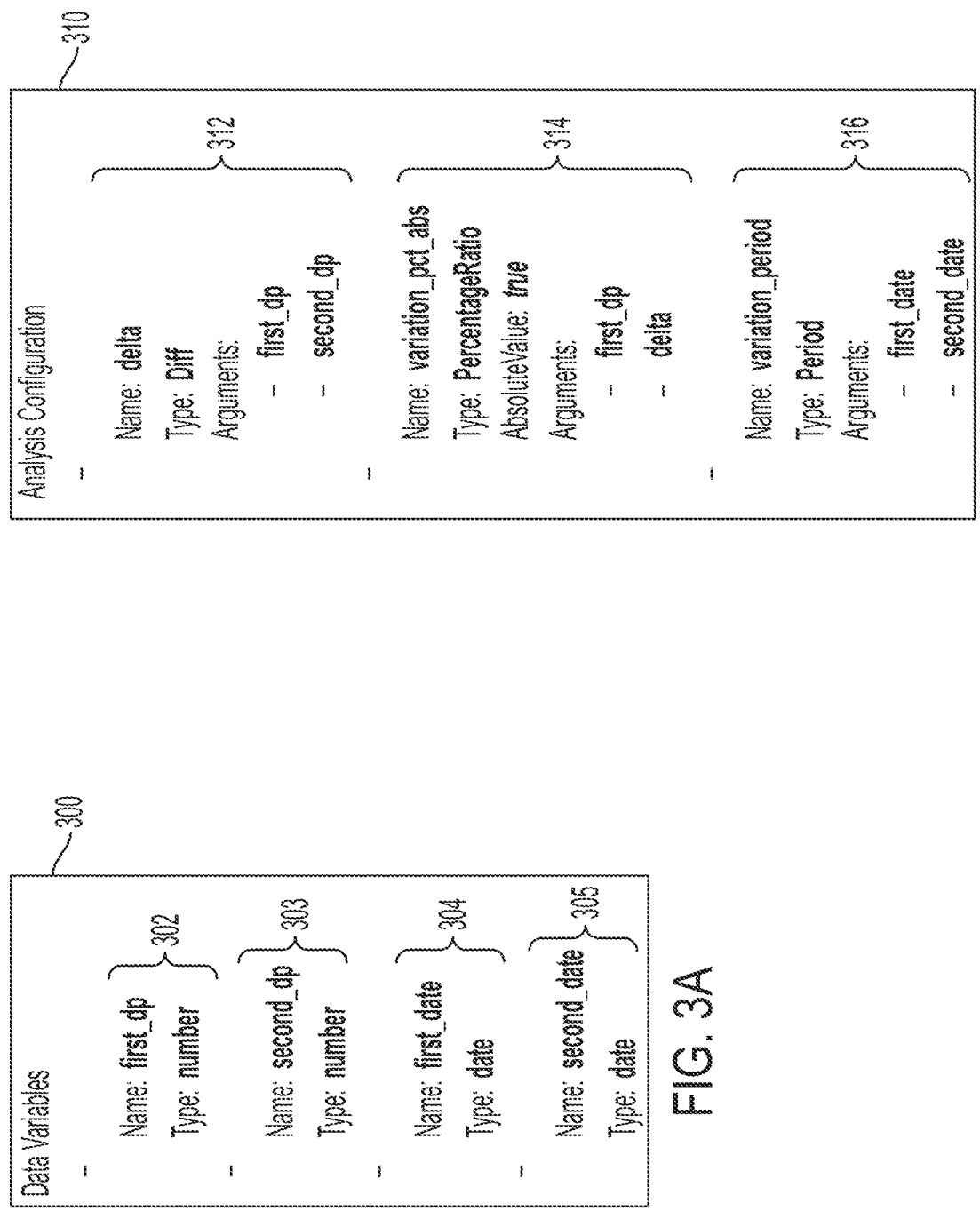

Attributes

- 321: Name: start_value
  # "Represents" allow to automatically find the type from the data point.
  Represents: first_dp

- 322: Name: end_value
  Represents: second_dp

- 323: Name: percentage_of_change
  Represents: variation_pct_abs

- 324: Name: period
  Represents: variation_period

- 325: Name: entity
  Accepted types:
  - NounPhrase

- 326: Name: variation_predicate
  Accepted types:
  - Verb
  - NounPhrase

- 327: Name: variation_intensity
  Accepted types:
  - Adverb
  - Adjective

- 328: Name: end_value_intensity
  Accepted types:
  - Adjective

```
Vocabulary
start_value:
  # "auto" uses the type default type of data point.
  Type: auto
  # The unit, scale, precision and format options are considered as
  # surface realization engine options.
  Unit: USD
  Scale: 1000
  Precision: 2
end_value:
  Type: auto
  Unit: USD
  Scale: 1000
  Precision: 2
percentage_of_change:
  Type: auto
  Precision: 1
period:
  Type: auto
  Format: YYYY
entity:
  Type: NounPhrase
  Root: "revenue"
  Determiner: DefiniteArticle
variation_predicate:
  ,
    Type: Verb
    Root: "increase"
  ,
    Type: Verb
    Root: "decrease"
  ,
    Type: NounPhrase
    Root: "growth"
    Determiner: IndefiniteArticle
  ,
    Type: NounPhrase
    Root: "drop"
    Determiner: IndefiniteArticle
variation_intensity:
  ,
    Type: Adverb
    Root: "importantly"
  ,
    Type: Adjective
    Root: "important"
end_value_intensity:
    Type: Adjective
    Root: "high"
```

FIG. 3E

```
first_dp: 50
second_dp: 100
first date: 2018/01/01
second date: 2019/01/01
```

FIG. 4B

```
delta: 50
variation_pct_abs: 100
variation_period:
        type: year
        value: 2018
```

FIG. 4C

```
- period
    - variation_intensity
        - variation_predicate
            - entity
            - start_value
            - end_value_intensity
                - end_value
```

FIG. 4D

```
- 2018
    - important
    - increase
        - revenue
        - 50
        - high
            - 100
```

FIG. 4E

```
- 2018
    - important
    - increase
        - join
            - indicator
            - other_indicator
        - 50
        - high
            - 100
```

FIG. 4F in 2019, <revenue> <to_increase> importantly from <50> to a high <100>

FIG. 4G

```
in 2017, < revenue> <to_decrease> from <70> to <50>.
in 2018, < revenue> <to_increase> importantly from <50> to a high <100>.
in 2018, < revenue_US> <to_increase> from <30> to <50>.
```

FIG. 4H

```
in 2017, the revenue <to_decrease> from <70> to <50>.
in 2018, it <to_increase> importantly from <50> to a high <100>.
in 2018, the US revenues <to_increase> from <30> to <50>.
```

FIG. 4I

```
In 2017, the revenue decreased from $70M to $50M.
In 2018, it increased importantly from $50M to a high $100M.
In 2018, the US revenues increased from $30M to $50M.
```

FIG. 4J

```
cause_consequence:
    cause:
        type: variation
        entity: $entity1
        period_start: $startDate1
        period_end: $endDate1
    consequence:
        type: variation
        entity: $entity2
        period_start: $startDate2
        period_end: $endDate2
```

FIG. 5A

```
cause_consequence:
    cause:
        type: variation
        entity: turnover
        period_start: 2019
        period_end: 2020
    consequence:
        type: variation
        entity: benefits
        period_start: 2019
        period_end: 2020
```

FIG. 5B

```
cause_consequence:
    cause:
        type: variation
        entity: $entity1
                    foreach: analysis.contributors
        period_start: $startDate1
        period_end: $endDate1
    consequence:
        type: variation
        entity: $entity2
        period_start: $startDate2
```

FIG. 5C

NATURAL LANGUAGE TEXT GENERATION USING SEMANTIC OBJECTS

CROSS-REFERENCE TO RELATED APPLICATIONS

The present application is a continuation claiming the benefit of priority under 35 U.S.C. § 120 to U.S. application Ser. No. 16/868,685, filed May 7, 2020, titled "NATURAL LANGUAGE TEXT GENERATION USING SEMANTIC OBJECTS," which claims the benefit of priority under 35 U.S.C. § 119(e) to U.S. Provisional Application Serial No.: 62/846,356, titled "NATURAL LANGUAGE TEXT GENERATION", filed on May 10, 2019, each of which is incorporated by reference in its entirety herein.

FIELD

The techniques described herein relate to the field of automatic generation of natural language text, and more particularly to techniques for generating natural language text with a natural language generation system using semantic objects.

BACKGROUND

Natural language generation (NLG) is the generation of human-language text (i.e., text in a human language) based on information in non-linguistic form. Natural language generation techniques may be used to generate natural language text for different NLG tasks, for example, to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting event using data about the game, or to generate text for a chatbot interacting with a customer based on data about the customer.

SUMMARY

Some embodiments provide for a method for generating natural language text with a natural language generation (NLG) system using a plurality of semantic objects including a first semantic object, the NLG system communicatively coupled to at least one data store. The method comprises: using at least one computer hardware processor to perform: obtaining a first specification of the first semantic object, the first specification specifying a first set of one or more data variables of the first semantic object, first attributes of the first semantic object, a first vocabulary of the first semantic object, and a first document structure configuration of the first semantic object; obtaining, from the at least one data store, first data related to the first set of data variables of the first semantic object; determining values of at least some of the first set of data variables using the first data obtained from the at least one data store; generating the natural language text including a first natural language text segment, using the first specification of the first semantic object, the values of at least some of the first set of data variables, and the NLG system, at least in part by: generating a first intermediate representation of the first semantic object using the first document structure configuration, the values of the first set of data variables, and the first attributes of the first semantic object; generating a second intermediate representation of the first semantic object from the first intermediate representation using the first vocabulary of the first semantic object; and generating the first natural language text segment from the second intermediate representation of the first semantic object; and outputting the generated natural language text.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform a method for generating natural language text with a natural language generation (NLG) system using a plurality of semantic objects including a first semantic object, the NLG system communicatively coupled to at least one data store, the method comprising: obtaining a first specification of the first semantic object, the first specification specifying a first set of one or more data variables of the first semantic object, first attributes of the first semantic object, a first vocabulary of the first semantic object, and a first document structure configuration of the first semantic object; obtaining, from the at least one data store, first data related to the first set of data variables of the first semantic object; determining values of at least some of the first set of data variables using the first data obtained from the at least one data store; generating natural language text including a first natural language text segment, using the first specification of the first semantic object, the values of at least some of the first set of data variables, and the NLG system, at least in part by: generating a first intermediate representation of the first semantic object using the first document structure configuration, the values of the first set of data variables, and the first attributes of the first semantic object; generating a second intermediate representation of the first semantic object from the first intermediate representation using the first vocabulary of the first semantic object; and generating the first natural language text segment from the second intermediate representation of the first semantic object; and outputting the generated natural language text.

Some embodiments provide for at least one non-transitory computer-readable storage medium storing processor executable instructions that, when executed by at least one computer hardware processor, cause the at least one computer hardware processor to perform a method for generating natural language text with a natural language generation (NLG) system using a plurality of semantic objects including a first semantic object, the NLG system communicatively coupled to at least one data store, the method comprising: obtaining a first specification of the first semantic object, the first specification specifying a first set of one or more data variables of the first semantic object, first attributes of the first semantic object, a first vocabulary of the first semantic object, and a first document structure configuration of the first semantic object; obtaining, from the at least one data store, first data related to the first set of data variables of the first semantic object; determining values of at least some of the first set of data variables using the first data obtained from the at least one data store; generating natural language text including a first natural language text segment, using the first specification of the first semantic object, the values of at least some of the first set of data variables, and the NLG system, at least in part by: generating a first intermediate representation of the first semantic object using the first document structure configuration, the values of the first set of data variables, and the first attributes of the first semantic object; generating a second intermediate representation of the first semantic object from the first intermediate representation using the first vocabulary of the first semantic object; and generating the first natural language text segment from the second intermediate representation of the first semantic object; and outputting the generated natural language text.

The foregoing is a non-limiting summary of the invention, which is defined by the attached claims.

BRIEF DESCRIPTION OF DRAWINGS

Various aspects and embodiments of the disclosure provided herein are described below with reference to the following figures. The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is a diagram of an illustrative environment 100 in which some embodiments of the technology described herein may operate.

FIG. 2E illustrates an example document structure for generating a single sentence from multiple semantic objects, in accordance with some embodiments of the technology described herein.

FIG. 2F illustrates an example sentence generated from multiple semantic objects, in accordance with some embodiments of the technology described herein.

FIG. 3A illustrates example data variables of an illustrative semantic object, in accordance with some embodiments of the technology described herein.

FIG. 3B illustrates an example analysis configuration of an illustrative semantic object, in accordance with some embodiments of the technology described herein.

FIG. 3C illustrates example attributes of an illustrative semantic object, in accordance with some embodiments of the technology described herein.

FIG. 3E illustrates an example vocabulary of an illustrative semantic object, in accordance with some embodiments of the technology described herein.

FIG. 4B shows an example of data for data variables of a semantic object shown in FIG. 3A, in accordance with some embodiments of the technology described herein.

FIG. 4C shows an example of results produced by performing mathematical analysis using the analysis configuration of FIG. 3B, in accordance with some embodiments of the technology described herein.

FIG. 4D shows a document structure configuration, selected from among the options shown in FIG. 3D, for generating natural language text, in accordance with some embodiments of the technology described herein.

FIG. 4E shows an example of a first intermediate representation of a semantic object generated using the document structure configuration shown in FIG. 4D, in accordance with some embodiments of the technology described herein.

FIG. 4F shows an example of results generated by using automatic aggregation, in accordance with some embodiments of the technology described herein.

FIG. 4G shows an example of a second intermediate representation of a semantic object generated from the first intermediate representation of the semantic object shown in FIG. 4E, in accordance with some embodiments of the technology described herein.

FIGS. 4H and 4I show an example of introducing referential expressions into a document having multiple sentences generated using respective semantic objects, in accordance with some embodiments of the technology described herein.

FIG. 4J shows example natural language text generated using one or more semantic objects, in accordance with some embodiments of the technology described herein.

FIG. 5A shows an example document structure configuration, in accordance with some embodiments of the technology described herein.

FIG. 5B shows an example intermediate representation generated using the example document structure configuration of FIG. 5A.

FIG. 5C shows another example document structure configuration, in accordance with some embodiments of the technology described herein.

DETAILED DESCRIPTION

Figure 1B:
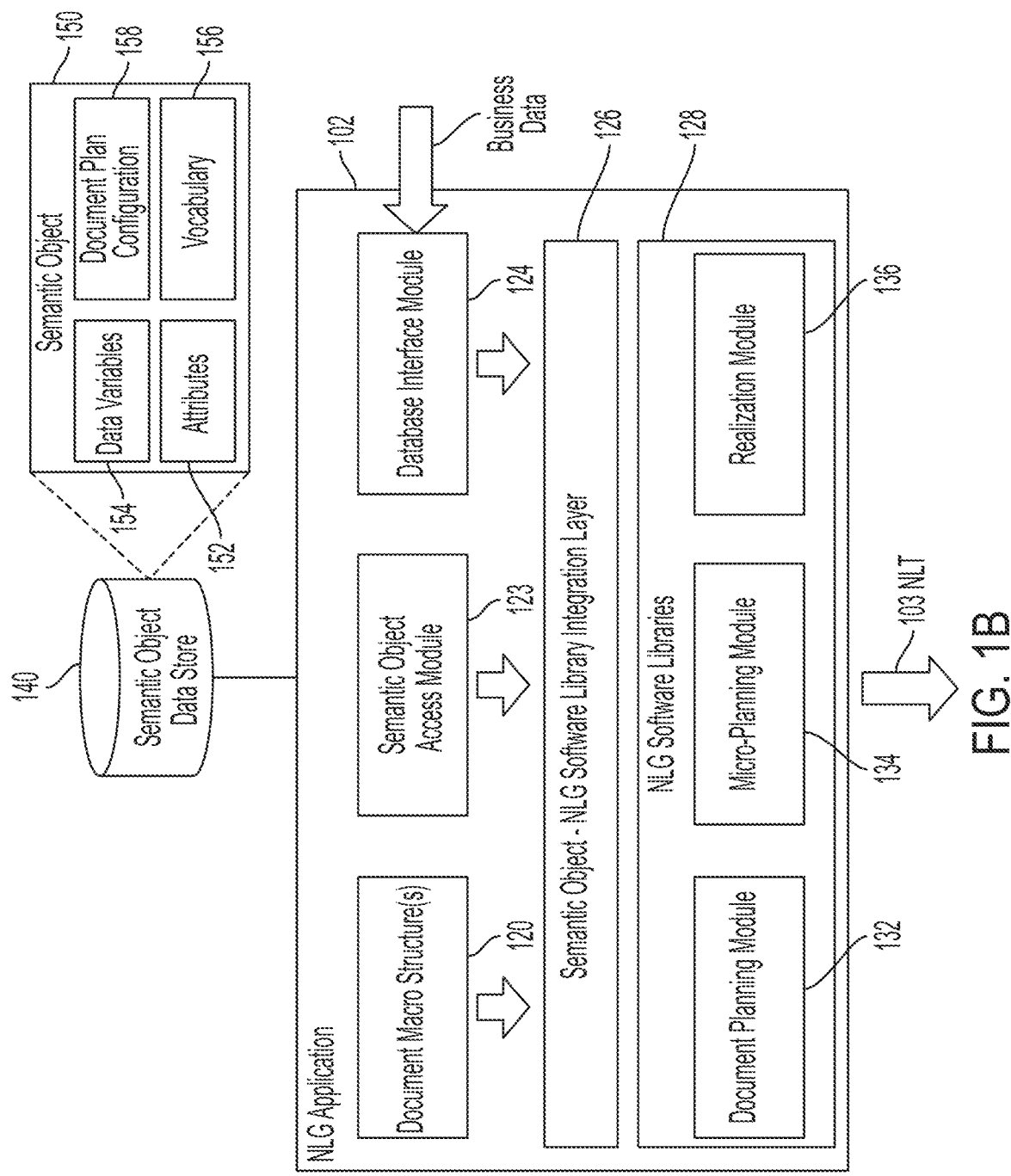
FIG. 1B is a diagram of example components of an illustrative NLG application 102 executing on the NLG system of FIG. 1B and configured to generate natural language text using semantic objects, in accordance with some embodiments of the technology described herein.

The inventors have recognized and appreciated that conventional NLG technology may be improved upon by improving techniques for using natural language generation (NLG) systems to perform different types NLG tasks. Conventional techniques for applying an NLG system to perform a new NLG task involve using either: (1) very complex NLG systems requiring an impractical amount of time and effort to customize to a specific NLG task, or (2) highly customized NLG systems that are restricted to performing a specific NLG task (e.g., generating profit and loss reports for a business) and cannot be adapted to perform another NLG task (e.g., generating automated e-mails to customers of the same business).

To address these shortcomings of conventional NLG technology, the inventors have developed an NLG system that facilitates rapid development of customized and high-quality NLG software applications to perform different NLG tasks by generating at least some of the text using novel constructs, developed by the inventors, which are termed "semantic objects" herein. Sometimes, a "semantic object" may be referred to as an "intention". The NLG system may be rapidly and inexpensively configured to perform thousands of different NLG tasks, something that was not previously possible.

Conventional techniques for applying NLG technology to generate natural language text for a specific task involve a series of steps including: (1) identifying a task to be performed by identifying text whose generation is to be automated (e.g., identifying that a particular type of report, e-mail, or other document is to be generated automatically; (2) identifying the source (e.g., a database) of non-linguistic data (e.g., numbers, names, customer data, business data, etc.) to be inserted into the natural language text as it is being generated; (3) creating a new NLG system, which involves extensive programming using an existing NLG framework (e.g., one or more NLG application programming interfaces (API), software packages, etc.); (4) coupling the NLG system to the source of non-linguistic data; and (5) coupling the NLG system to one or more systems to which the NLG system is to provide generated text. These steps are time consuming, require low-level programming, and are expensive.

Although available NLG software and APIs may help to reduce the time spent on some of the above individual steps, the overall process needs to be repeated for every new NLG task, making such conventional approaches impractical, and severely limiting applicability of NLG systems to real-world industrial tasks. Moreover, since available NLG software and APIs were designed for general applicability, they are complex and require extensive configuration (e.g., configuring document structure, data selection, vocabulary, sentence boundaries, formatting, referent selection, etc.), which has to be done manually by users. As a result, creating and/or configuring an NLG system to perform an NLG task is rendered more complex and increases development times.

Another conventional approach is to use NLG systems highly tailored to specific tasks (e.g., an NLG system customized for developing a particular type of report, an NLG system customized for generating a summary of a sporting event, etc.). This improves development times because it reduces the possible inputs to some standard format and allows for the automation of many decisions that would otherwise have to be configured manually by the user. The automation of the configuration may for example take the form of domain specific vocabulary, fixed document structures, standardized data connectors, predefined lexicographic rules, and the like. The inventors has appreciated, however, that restricting an NLG system to a specific domain of application is excessively limiting, given that new NLG frameworks would be required for each new domain. For example, an NLG system highly tailored to the task of generating e-mails for businesses in one industry (e.g., airline industry) would not be applicable to the task of generating e-mails for businesses in another industry (e.g., banking industry). Such NLG systems are simply not adaptable to other tasks.

Accordingly, the inventors have developed an NLG system that uses semantic objects to facilitate rapid development of customized and high-quality NLG software applications to perform different NLG tasks. The NLG system may be configured with one set of one or more semantic objects to perform one NLG task and, at another time, may be configured with another set of one or more semantic objects to perform a different NLG task. In this way, the previously time-consuming, programming-heavy, and expensive activity of developing an NLG software application for an NLG task may be reduced to specifying a set of semantic objects for the task, which is substantially simpler than configuring conventional complex NLG systems. The same underlying NLG system (e.g., the illustrative NLG system 101 of FIG. 1) may be configured for different NLG tasks using different sets of semantic objects. Among various benefits, using semantic objects automates the configuration of various stages of the NLG process including lexicalization, aggregation, referential expression generation, and surface realization, whereas in conventional systems such stages have to be configured manually.

In some embodiments, a semantic object specifies configuration data used by an NLG system (e.g., NLG system 101) to generate a respective natural language segment (e.g., a phrase, a sentence, a set of multiple sentences). In some embodiments, a semantic object contains multiple types of configuration data used to configure different parts of the NLG system to generate the respective natural language segment. For example, an NLG system may include components to perform functions including, but not limited to, data analysis, document structuring, lexicalization, micro-planning, and surface realization. In turn, the semantic object may include configuration data for configuring the NLG system to perform such functions. In this example, the semantic object may include an analysis configuration having data for configuring the NLG system to perform data analysis, a document structure configuration and attributes (e.g., data attributes and lexical attributes) having data for configuring the NLG system to perform document structuring, a vocabulary having data for configuring the NLG system to perform lexicalization, a micro-planning configuration having data for configuring the NLG system perform micro-planning, and a surface realization configuration having data for configuring the NLG system to perform surface realization.

In some embodiments, a semantic object includes a plurality of attributes, each of which may be substituted by one or more words from an associated vocabulary and/or data from another system when the semantic object is rendered into natural language text by the NLG system. In this way, a semantic object may specify the manner in which linguistic data (e.g., words and phrases to be used for generating text) and non-linguistic data (e.g., business data having numeric values) may be combined in generated natural language text.

In some embodiments, a specification of a semantic object, containing data associated with (e.g., defining) the semantic object, may be stored in any suitable non-transitory computer readable storage medium including volatile and non-volatile memory.

In some embodiments, the specification of the semantic object may be stored using one or more files. In some embodiments, the specification may be defined using any suitable mark-up language (e.g., XML, SGML, YAML, JSON, etc.), as aspects of the technology described herein are not limited in this respect. In some embodiments, the specification of a semantic object may be stored in volatile memory using on or multiple data structure(s).

Figure 1C:
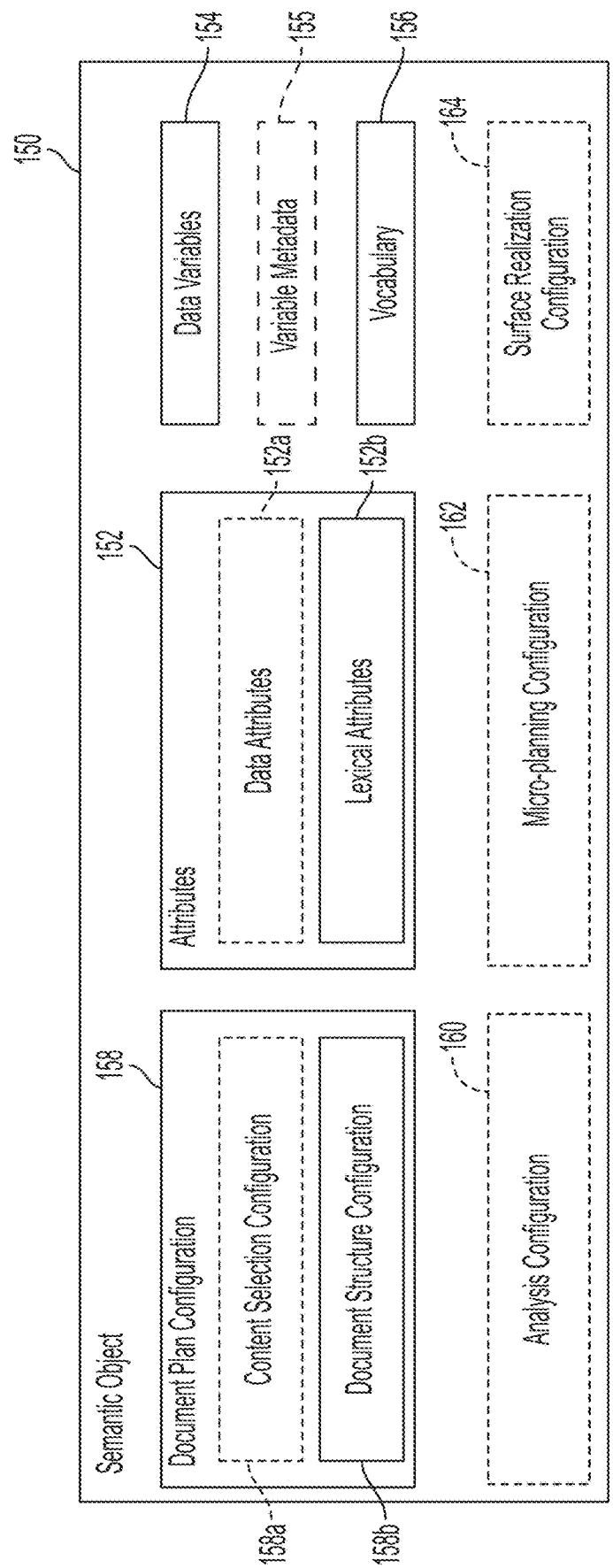
FIG. 1C is a diagram of an illustrative semantic object, in accordance with some embodiments of the technology described herein.
Figure 1D:
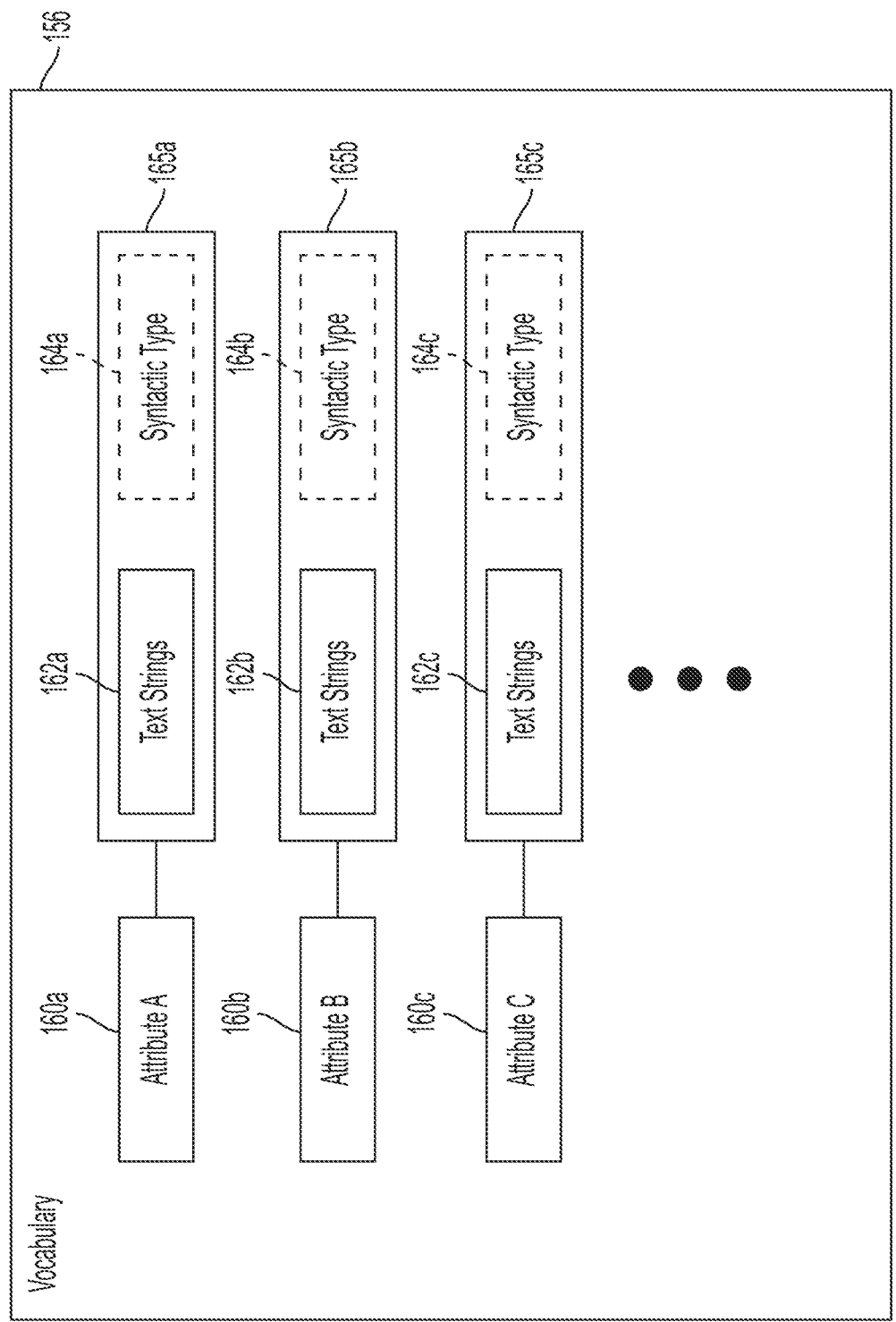
FIG. 1D is a diagram of an example vocabulary for the semantic object of FIG. 1C, in accordance with some embodiments of the technology described herein.
Figure 2A:
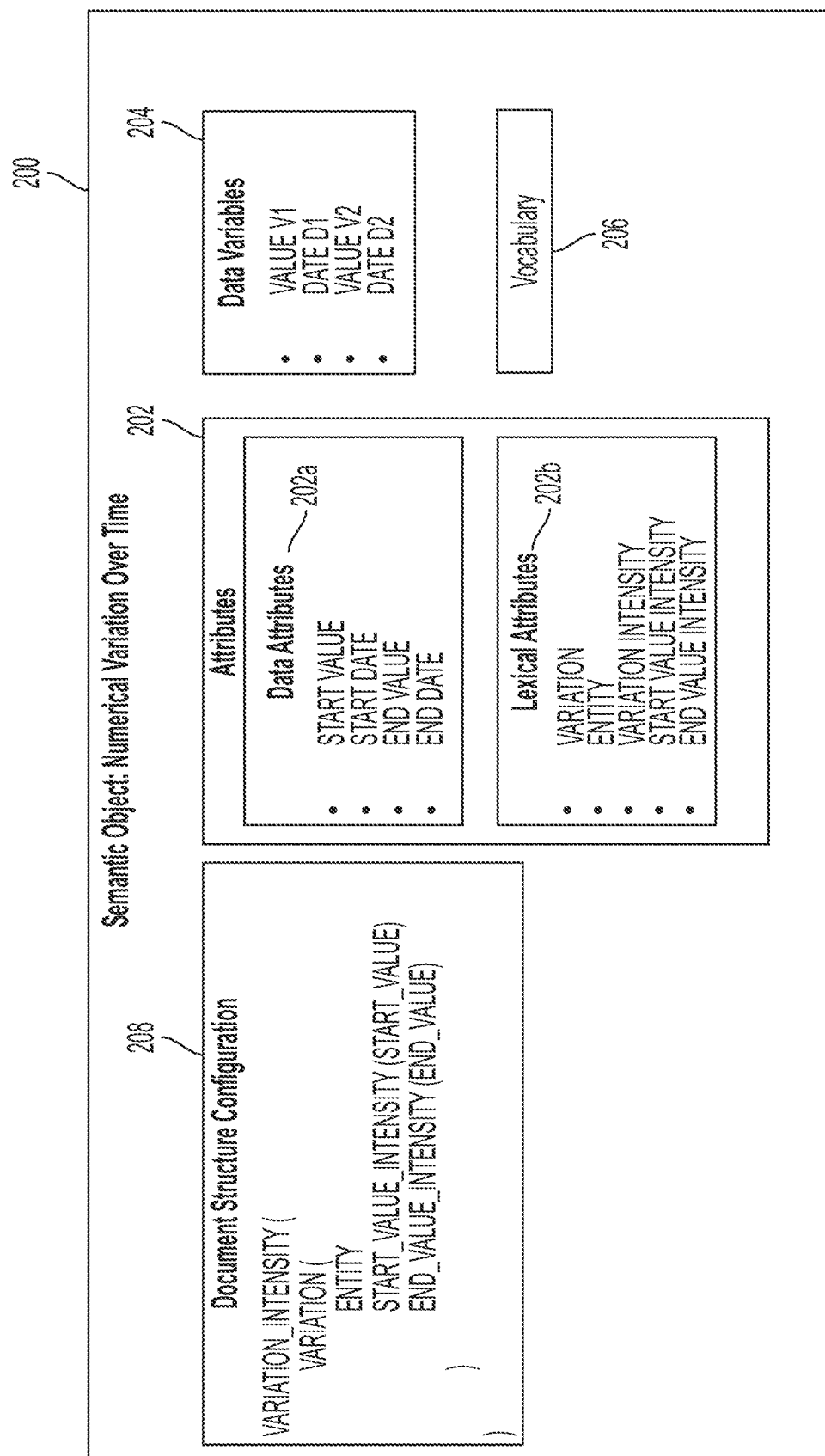
FIG. 2A is a diagram of an illustrative semantic object 200 having attributes, data variables, a vocabulary, and a document structure configuration, in accordance with some embodiments of the technology described herein.
Figure 2B:
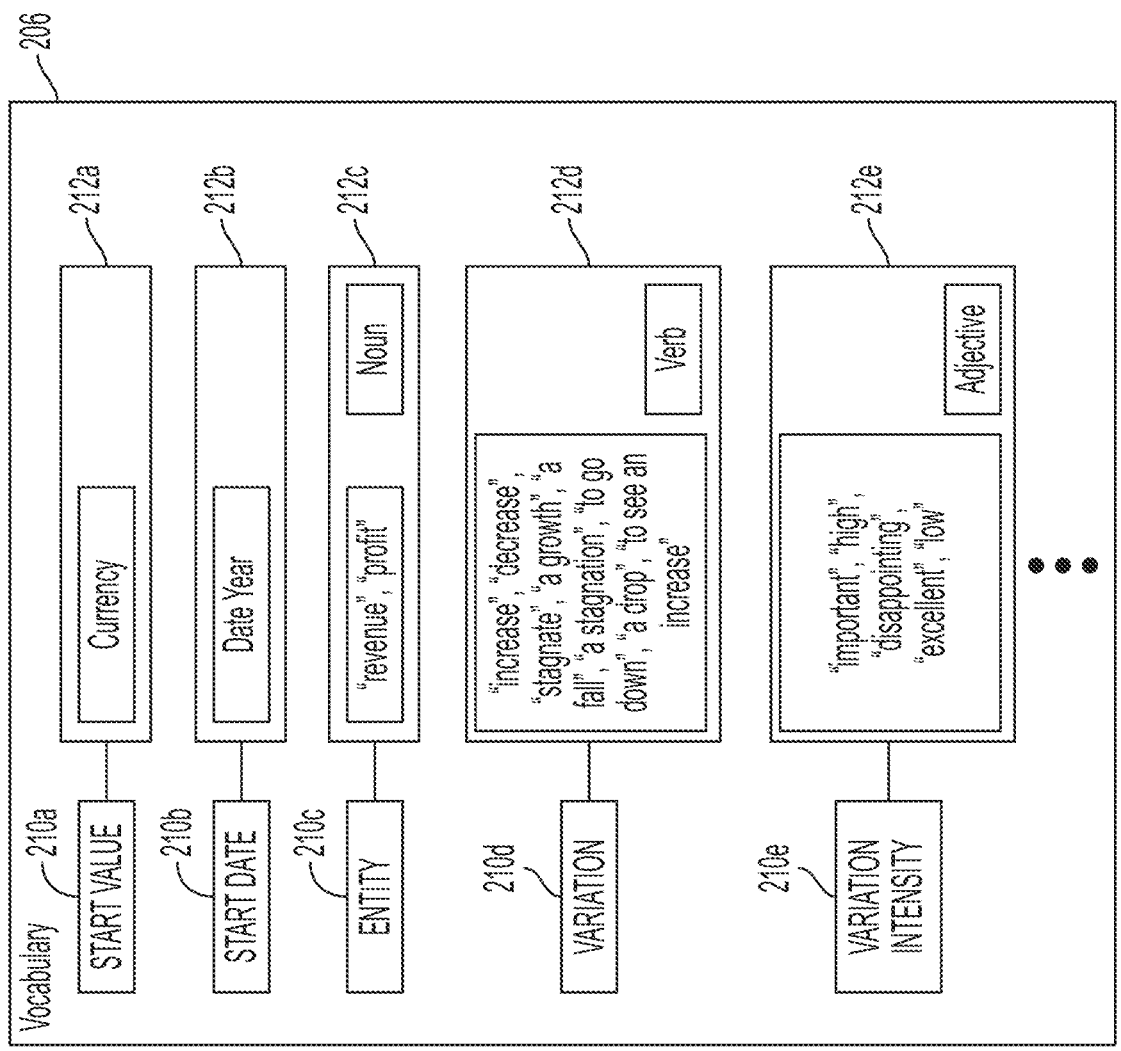
FIG. 2B is a diagram of an example vocabulary for the semantic object 200 of FIG. 2A, in accordance with some embodiments of the technology described herein.
Figure 2C:
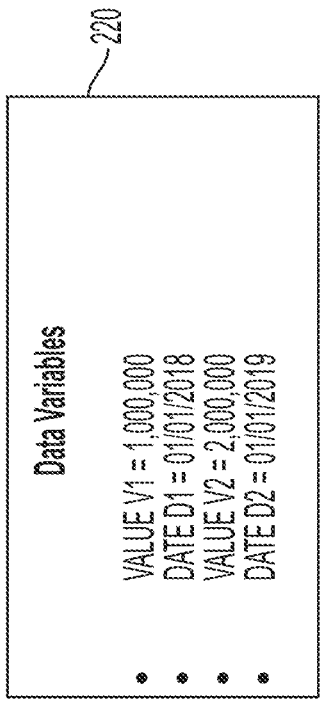
FIG. 2C is a diagram of example data variables for the semantic object 200 of FIG. 2A, in accordance with some embodiments of the technology described herein.

Examples of semantic objects are provided herein including with reference to the example semantic objects 150 of FIGS. 1C and 1D, the semantic object of FIGS. 3A-3F, and the semantic object 200 of FIGS. 2A-2C.

Some embodiments are directed to techniques for generating one or more documents(s) with a natural language system (NLG) system configured with a plurality of semantic objects. The NLG system may be configured to use individual semantic objects, from among the plurality of semantic objects, to generate respective natural language text segments (e.g., a phrase, a sentence, multiple sentences). For example, an NLG system may be configured to generate a document having multiple natural text segments by generating the multiple text segments using respective semantic objects.

Some embodiments are directed to techniques for generating natural language text with a natural language generation (NLG) system using a plurality of semantic objects including a first semantic object, the NLG system communicatively coupled to at least one data store (e.g., a database external to the system). The techniques include a method comprising: (1) obtaining a first specification of the first semantic object, the first specification specifying a first set of one or more data variables of the first semantic object, first attributes of the first semantic object, a first vocabulary of the first semantic object, and a first document structure configuration of the first semantic object; (2) obtaining, from the at least one data store, first data related to the first set of data variables of the first semantic object; (3) determining values of at least some of the first set of data variables using the first data obtained from the at least one data store; (4) generating the natural language text including first natural language text, using the first specification of the first semantic object, the values of at least some of the first set of data variables, and the NLG system, at least in part by: (4a) generating a first intermediate representation of the first semantic object using the first document structure configuration, the values of the first set of data variables, and the first attributes of the first semantic object; (4b) generating a second intermediate representation of the first semantic object from the first intermediate representation using the first vocabulary of the first semantic object; and (4c) generating the first natural language text from the second intermediate representation of the first semantic object; and (5) outputting the generated natural language text.

In some embodiments, the plurality of semantic objects includes a second semantic object, the technique further comprising: obtaining a second specification of the second semantic object, the second specification specifying a second set of one or more data variables of the second semantic object, second attributes of the second semantic object, a second vocabulary of the second semantic object, and a second document structure configuration of the second semantic object; obtaining, from the at least one data store, second data related to the second set of data variables of the second semantic object; and determining values of at least some of the second set of data variables using the second data obtained from the at least one data store, wherein generating the natural language text comprises generating second natural language text using the second specification of the second semantic object, the values of at least some of the second set of data variables.

In some embodiments, the first semantic object and the second semantic object may be used to generate two different sentences. For example, in some embodiments, generating the second natural language text comprises: generating a first intermediate representation of the second semantic object using the second document structure configuration, the values of the second set of data variables, and the second attributes of the second semantic object; generating a second intermediate representation of the second semantic object from the first intermediate representation of the second semantic object using the second vocabulary of the second semantic object; and generating the second natural language text (e.g., a second sentence different from the first sentence) from the second intermediate representation of the second semantic object.

In some embodiments, the first semantic object and the second semantic object may be used to generate a single sentence. To this end, the intermediate representations generated from the first and second semantic object may be composed to form a composed intermediate representation that may be used to generate a single sentence. Accordingly, in some embodiments, generating the natural language text comprises: generating a first intermediate representation of the second semantic object using the second document structure configuration, the values of the second set of data variables, and the second attributes of the second semantic object; composing the first intermediate representation of the first semantic object and the first intermediate representation of the second semantic object to obtain a composed intermediate representation; and using the composed intermediate representation to generate the single sentence.

Figure 3D:
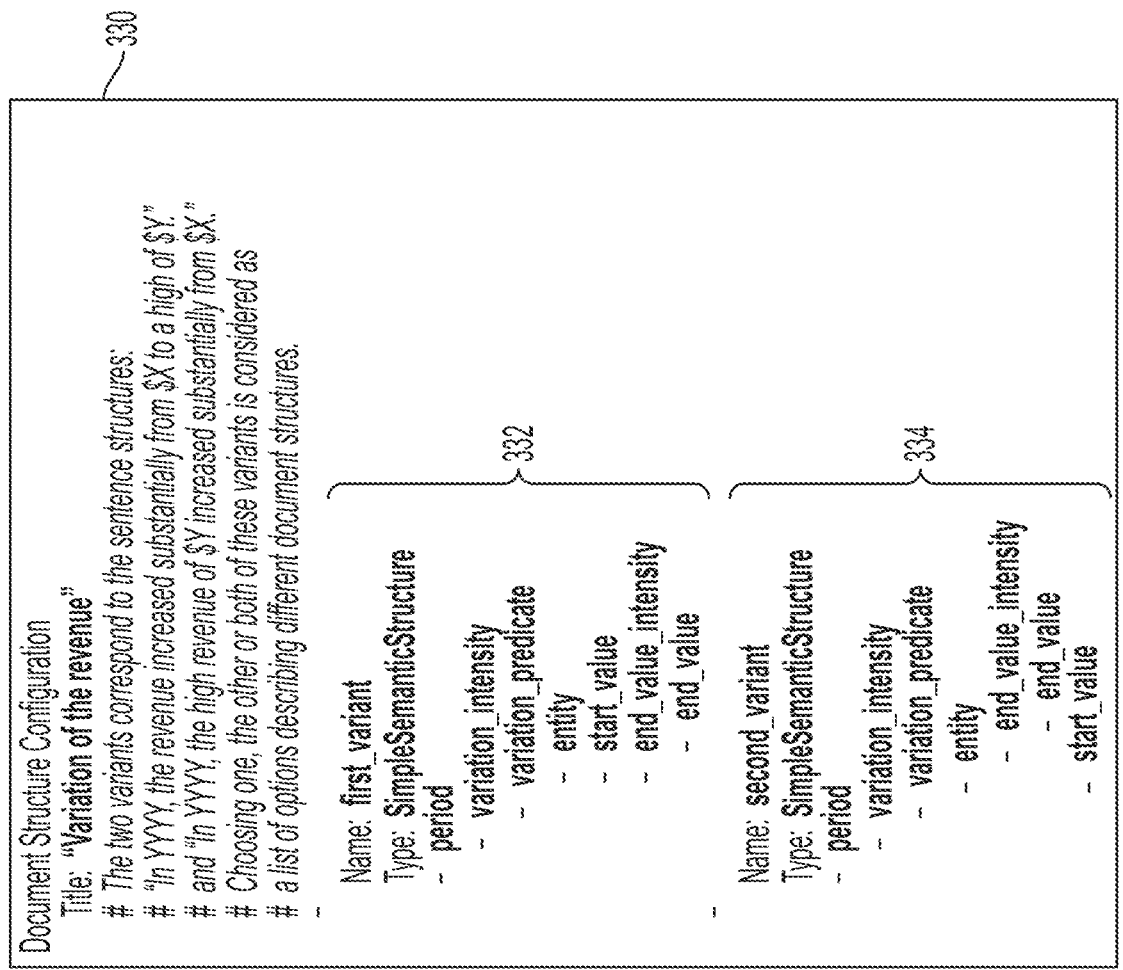
FIG. 3D illustrates an example document structure configuration of an illustrative semantic object, in accordance with some embodiments of the technology described herein.

In some embodiments, the first document structure configuration for the first semantic objects specifies multiple document structures (e.g., as shown in FIG. 3D where two document structures called "first variant" and "second variant" are illustrated), wherein the method further comprises selecting from among the multiple document structures to obtain a selected document structure, and wherein generating the first intermediate representation is performed using the selected document structure.

In some embodiments, the first specification of the first semantic object further specifies a first analysis configuration (e.g., as illustrated in FIG. 3B), and wherein determining the values of at least one of the first set of data variables comprises processing the data obtained from the at least one data store using the first analysis configuration (e.g., as illustrated in FIGS. 4B and 4C).

In some embodiments, the first specification of the first semantic object further comprises a content selection configuration indicating a subset of the first attributes to use for generating the natural language text, and wherein generating the first intermediate representation of the firs semantic object is performed using the content selection configuration.

Figure 3F:
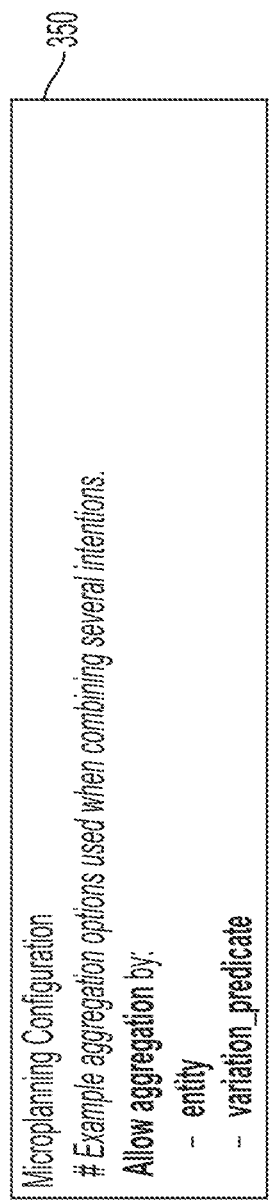
FIG. 3F illustrates an example micro-planning configuration of an illustrative semantic object, in accordance with some embodiments of the technology described herein.

In some embodiments, the first specification of the first semantic object further comprises a micro-planning configuration (e.g., as illustrated in FIG. 3F), and wherein the method further comprises: applying automatic aggregation to the first intermediate representation of the first semantic object using the micro-planning configuration.

In some embodiments, the first specification of the first semantic object further comprises a micro-planning configuration, and the method further comprises: applying referent generation to the second intermediate representation of the first semantic object using the micro-planning configuration.

In some embodiments, the first specification of the first semantic object further comprises a surface transformation configuration, and the method further comprises: applying one or more surface transformations to the second intermediate representation of the first semantic object using the surface transformation configuration.

In some embodiments, outputting the natural language text generated by an NLG system comprises providing the natural language text to a publishing system external to the NLG system. The publishing system may be configured to generate an electronic document (e.g., a webpage, a PDF file, a text document, etc.) including the natural language text; and transmit the electronic document over at least one communication network to a user.

Following below are more detailed descriptions of various concepts related to, and embodiments of techniques for natural language generation using semantic objects. Various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Illustrative NLG Systems for Generating Natural Language Text Using Semantic Objects FIG. 1A is a diagram of an illustrative environment 100 in which some embodiments of the technology described herein may operate. The environment 100 includes an NLG system 101 that may be configured by administrator 110 to perform a natural language generation task. As part of the configuration, administrator 110 may configure NLG system 101 to communicate with business data store(s) 112 to obtain business data 113, which may include data to be incorporated into natural language text generated by NLG system 101. The administrator 110 may configure NLG system 101 to perform the NLG task by specifying one or more semantic object(s) 122 and/or one or more document macro structures 120 that the NLG system 101 will utilize to generate natural language text.

In some embodiments, the natural language text (NLT) generated by NLG system 101 may be output to one or multiple destinations (e.g., one or more other devices, users, etc.). For example, as shown in FIG. 1A, NLG system 101 may generate NLT 103 using one or more of the semantic objects 122 and at least some of the business data 113, and provide the NLT 103 to publishing system 104. The publishing system 104 may include the NLT 103 into content 105 (e.g., a webpage, an electronic document, a report, a form, and/or any other suitable type of document) and may provide the content 105 to a user 108, for example, by providing content 105 to a software application program 106 (e.g., an Internet browser) executing on the computing device 107 (e.g., smartphone, laptop, desktop, or any other suitable computing device) of user 108.

It should be appreciated that although, in some embodiments, publishing system 104 may be a web server, this is only an example and publishing system 104 may include any other type(s) of computing device(s). For example, in some embodiments, publishing system 104 may include one or more computing devices operated by a business and which use the NLT text to create documents, reports, e-mails, forms, and/or any other suitable types of document(s) used in connection with the business.

As described above, in some embodiments, the NLG system 101 may obtain, from business data store(s) 112, business data 113 at least some of which may be included in natural language text to be generated by the NLG system 101. In some embodiments, this may be done using database queries (e.g., SQL or MDX queries) or in any other suitable way. The business data 113 may include any suitable type(s) of data related to a business and may be numeric data (e.g., the revenues, profits, and/or losses of a business in a given period of time, etc.), alphabetic data (e.g., names of customers, employees, projects, etc.), or alphanumeric data. For example, the business data may include the values 70,000,000 and 50,000,000 and these data may be used by the NLG system to generate the text "In 2018, the revenue decreased from $70M to $50M". The business data 113 may be in any suitable format, as aspects of the technology described herein are not limited in this respect. The business data store(s) 112 may include one or multiple storage devices storing data in one or more formats of any suitable type. For example, the storage device(s) part of data store(s) 112 may store data using one or more database tables, spreadsheet files, flat text files, and/or files in any other suitable format. In some embodiments, the data store(s) 112 may include one or more databases of any suitable type(s).

In some embodiments, NLG system 101 may be configured to perform one or multiple NLG tasks. In some embodiments, the NLG system 101 may be configured to perform an NLG task by an NLG application 102 configured to perform the NLG task. An NLG application 102 may be configured to perform one or multiple NLG tasks, as aspects of the technology described herein are not limited in this respect.

As shown in FIG. 1A, NLG application 102 has multiple components including document macro structure(s) 120, semantic object(s) 122, database interface module 124, NLG software tools 128, and semantic object—NLG software tool integration layer 126, which is referred to herein as "integration layer 126" for clarity. It should be appreciated that these components are illustrative and that, in some embodiments, an NLG application 102 may include one or more components in addition to or instead of these components.

In some embodiments, the NLG application 102 may generate natural language text by: (1) obtaining non-linguistic content from semantic object(s) 122 and business data 113 (obtained via the database interface module 124); (2) determining a macro structure for the natural language text using document macro structure(s) 120; (3) using the integration layer 126 to generate natural language text from the non-linguistic content using the macro structure and the NLG software tool 128.

In some embodiments, document macro structure(s) 120 may include information indicating the overall organization of a document to be generated. As described herein, in some embodiments, each of multiple semantic objects may be used to generate a respective natural language text segment (e.g., a phrase, a single sentence, multiple sentences). The document macro structure(s) 120 may include information indicating the order in which to organize natural language text generated using semantic objects. For example, semantic objects 122 may include ten semantic objects and document structure(s) 120 may indicate the order in which the ten natural language text segments (generated using the ten semantic objects) are to be organized within the document to be generated. Additionally, in some embodiments, the document macro structure(s) 120 may include information specifying a template for a report (e.g., sections, section headings, formatting, etc.).

Semantic object(s) 122 may include any suitable number of semantic objects, as aspects of the technology described herein are not limited in this respect. Examples of semantic objects are described herein. In some embodiments, the semantic object(s) 122 may be part of NLG application 102. In other embodiments, the semantic object(s) 122 may be stored in semantic object data store 140, which may be within NLG system 101 or external to NLG system 101. In some such embodiments, NLG application 102 may be configured to access information about semantic objects 122 using semantic object access module 123 that is configured to communicate with semantic object data store 140. Semantic object data store 140 may be any suitable type of data store and may include one or multiple storage devices storing data in one or more formats of any suitable type. For example, the storage device(s) part of data store 140 may store data using one or more database tables, spreadsheet files, flat text files, and/or files in any other suitable format. In some embodiments, the data store 140 may include one or more databases of any suitable type(s).

In some embodiments, database interface module 124 may be configured to access business data 113 from business data store(s) 112. This may be done in any suitable way. In some embodiments, the database interface module 124 may be configured to obtain data from (either pull data from or be provided data by) the business data store(s) 112. The data may be provided via a communication network (not shown), such as the Internet or any other suitable network, as aspects of the technology described herein are not limited in this respect.

In some embodiments, a user (e.g., administrator 110) may configure NLG application 102 to perform a particular NLG task by configuring the components 120, 122, and 124. For example, the user may provide the NLG application 102 with one or more document macro structure(s) 120 and semantic object(s) 122 (e.g., by providing one or more configuration files, for instance specified using a mark-up language, that specify the document macro structure(s) 120 and semantic object(s) 122). Additionally, when the NLG task involves generating NLT containing business data, the user may configure the NLG application 102 to obtain the business data needed from the business data store(s) 112. This may be done in any suitable way. For example, the user may configure the database interface module 134 to obtain specific data records and/or values from particular tables in a database part of business data store(s) 112 so that these data may be obtained and subsequently used together with the semantic objects to generate natural language text.

In some embodiments, the integration layer 126 may be configured to employ NLG software tools 128 to generate natural language text using data contained in the document macro structure(s) 120, semantic object(s) 122, and/or data obtained using the database interface module 134. The techniques for how the integration layer 126 achieves this result are described herein including with reference to FIGS. 4A, 6 and numerous other examples.

In some embodiments, the NLG software tools 128 may include one or more software libraries, one or more application programming interfaces, one or more software programs, and/or any other suitable software tools used to facilitate generation of natural language text from non-linguistic data. In some embodiments, natural language text may be generated from non-linguistic data (e.g., data contained in document macro structure(s) 120, semantic object(s) 122, and/or data obtained using database interface module 134) using multiple stages of processing including, by way of example and not limitation: (1) an analysis stage; (2) a document planning stage; (3) a micro-planning stage; and a (4) surface realization stage. Accordingly, in some embodiments, the NLG software tools 128 may include software for performing the processing for the processing of these stages. The NLG software tools 128 may include software to perform one specific type of stage and/or software to perform multiple stages.

For example, as shown in FIG. 1B, NLG software tools 128 may include a document planning module 132 for performing processing for the document planning stage, a micro-planning module 134 for performing processing for the micro-planning stage, and a surface realization module 136 for performing processing for the surface realization stage. Each of the modules may include processor-executable instructions that when executed perform the functionality associated with the stage.

In some embodiments, the document planning stage of natural language generation builds an intermediate representation of the document to be generated. In some embodiments, the intermediate representation may describe the levels of the document (e.g., titles, sections, chapters, paragraphs, etc.). Additionally, the intermediate representation may describe relationships among elements of the document such as causal relationships or other rhetorical constructs. In some embodiments, the intermediate representation may comprise multiple entities, the smallest ones of which correspond to natural language segments generated from semantic objects, as described herein. A natural language segment may be a phrase, a single sentence, multiple sentences. A natural language segment may include a few words (e.g., one, two, between 3 and 10, between 5 and 20) to a paragraph in length (e.g., between 20 and 200 words).

In some embodiments, the document planning stage of natural language generation, implemented by document planning module 132, may include: (1) a content determination stage during which an NLG system may obtain content to be expressed in natural language text; and (2) a document structuring stage for determining the rhetorical structure of the text to be generated during which the NLG system may generate a document plan indicating how the obtained content is to be organized for presentation in the natural language text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature).

In some embodiments, the document planning stage may be implemented at least in part by using one or more semantic objects (e.g., using one or more semantic object(s) 122). In some embodiments, a semantic object includes a set of attributes and each of one or more of the attributes may be associated with a vocabulary for rendering that attribute into corresponding natural language text. During the document planning stage, the NLG system 101 may determine to generate a natural language segment (e.g., a sentence) using a particular semantic object. The particular semantic object may be used to determine the structure for the natural language segment—the segment may be structured to have content corresponding to attributes of the semantic object. The order of presentation of the content may be determined in the document planning stage and, for example, may be determined based on the document plan configuration (e.g., document plan configuration 158) part of the semantic object (e.g., semantic object 150).

For example, during the document planning stage, the NLG system 101 may determine to generate a natural language segment using semantic object 150 having attributes 152, data variables 154, vocabulary 156, and document plan configuration 158. The segment may be generated to have content corresponding to attributes 152 and data variables 154 of the semantic object. The vocabulary 156 may be used to render the attributes 152 into natural language text. The business data 113 may be used to specify values for the data variables 154 (optionally, with further analysis being performed on the values). The order in which the content corresponding to attributes 152 and data variables 154 is presented in the generated natural language segment may be specified by document plan configuration 158. Further examples of this are described herein including with reference to FIGS. 2A-2F, 3A-3F, and 4A-4J.

In some embodiments, the micro-planning stage of NLG, implemented by micro-planning module 134, may involve determining, based at least in part on the document plan, a syntactic structure for the text to be generated. In some embodiments, the micro-planning stage may involve building syntactic structure of the text from a document structure, which may involve choosing the vocabulary, the syntactic constructs, and the sentence boundaries. In some embodiments, the micro-planning stage may include an aggregation stage, a lexicalization stage, and a referring expression stage. The aggregation stage may involve determining boundaries between sentences. The lexical choice stage may involve choosing words to describe particular concepts to be expressed in the text to be generated (e.g., determining whether "warm" or "hot" should be used to describe a temperature of 80 degrees). In some embodiments, vocabularies for semantic objects may be used to perform the lexical choice stage for sentences generated based on semantic objects. For example, the lexical choice stage may be performed by substituting one or more of the attributes (e.g., attributes 152) specified by a semantic object (e.g., semantic object 150) with a corresponding vocabulary word (or words) from the vocabulary (e.g., vocabulary 154) for the attribute. In some embodiments, lexicalization may be performed using one or more grammars, for example, one or more abstract categorical grammars (ACGs), tree adjoining grammars (TAGs), context free grammars (CFGs), functional identification grammars (FIGs), any other suitable grammars, and/or in any other suitable way. The referring expression stage may involve selecting expressions, for use in the text to be generated, to refer to concepts that appear more than once in the text (e.g., selecting the pronoun "it" to refer to "the weather" in a portion of the text to be generated).

In some embodiments, the surface realization stage of NLG, implemented by surface realization module 136, may involve transforming the syntactic structure of the document to be generated into text and may include a linguistic realization stage and a structural realization stage. The linguistic realization stage may involve generating actual text according to rules of syntax, morphology, and orthography, and may include putting words in order (e.g., in a manner consistent with the order of attributes in a semantic object for sentences being generated based on a semantic object), conjugating verbs, ensuring adjective-noun agreement, etc. Additional low-level rules relating to number formats, date formats, and capitalization may be applied at this stage. During the structural realization stage, the text generated in the linguistic realization stage may be output in a desired format (e.g., a PDF file, a webpage, an XML file, etc.). The above-described tasks may be performed by an NLG system sequentially in stages or in any other suitable way.

In some embodiments, any one or more of the NLG software tools 128 may be developed from scratch, use already available software tools, or be a combination of one or more available software tools and software developed from scratch, as aspects of the technology described herein are not limited in this respect. There are numerous available software tools which may be leveraged, in some embodiments. For example, the NLG software tools 128 may include one or more available software tools to perform micro-planning A non-limiting example of such a tool is the EasyText software for micro-planning, described in the article called "EasyText: an operational NLG system." L. Danlos, F. Meunier, and V. Combet. In Proceedings of the 13$^{th}$ European Workshop on Natural Language Generation, pages 139-144. Association for Computational Linguistics, 2011, which article is incorporated by reference herein in its entirety. EasyText software is also described in U.S. Pat. No.: 9,135,244, titled "Method and apparatus for configurable micro-planning," which is incorporated by reference in its entirety.

As another example, the NLG software tools 128 may include one or more available software libraries for lexicalization. For example, the NLG software libraries 128 may include one or more software tools to perform lexicalization using abstract categorical grammars (ACGs) such as the ACG Toolkit (see e.g., https://acg.loria.fr/#Software). As another example, the NLG software tools 128 may include one or more software tools to perform surface realization. A non-limiting example of such a tool is the SimpleNLG software for surface realization, described the article called "Simplenlg: A realization engine for practical applications". A. Gatt and E. Reiter. In Proceedings of the 12$^{th}$ European Workshop on Natural Language Generation, pp. 90-93. Association for Computational Linguistics, 2009, which article is incorporated by reference herein in its entirety.

As may be appreciated from the foregoing, the techniques developed by the inventors for generating natural language text using semantic objects may utilize any of numerous types of NLG software tools. In some embodiments, such NLG software tools may include constructs for representing semantic object components including data variables, attributes, and vocabularies. For example, an NLG software tool part of tools 128 may represent data variables using a relational database schema, an object oriented programming (OOP) class hierarchy, or any other suitable structured representation. Additionally or alternatively, less structured representations, such as attribute-value pairs and/or NoSQL database schemas may be utilized. As another example, an NLG software tool part of tools 128 may represent semantic object attributes as tree structures with typed nodes (e.g., semantic trees), directed acyclic graphs, or other types of graphs, for example, ontologies using the web ontology representation language (OWL). As another example, an NLG software tool part of tools 128 may represent semantic object vocabularies using attribute-value pairs. As yet another example, an NLG software tool part of tools 128 may use an underlying linguistic theory to represent syntactic, morphological and phonological information, which may impose a representation. Non-limiting examples of such linguistic theories are Tree Adjoining Grammars, Functional Unification Grammars, Meaning-Text theory, and Abstract Categorical Grammars In some embodiments, the NLG software tools 128 used by NLG system 101 may be configured to generate a natural language text segment, such as a single sentence, from multiple semantic objects by composing intermediate representations generated from the semantic objects. To facilitate this, the NLG software tools 128 used may use semantic and/or syntactic representations that are compositional. Such compositionality may be achieved using software tools that rely on linguistic theories for the syntax-semantic interface, examples of which are provided herein.

FIG. 1C is a diagram of an illustrative semantic object 150, in accordance with some embodiments of the technology described herein. As shown in FIG. 1C, semantic object 150 includes attributes 152, which includes data attributes 152*a* and lexical attributes 152*b*, data variables 154, variable metadata 155, vocabulary 156, document plan configuration 158, which includes content selection configuration 158*a* and document structure configuration 158*b*, analysis configuration 160, micro-planning configuration 162, and surface realization configuration. These components of semantic object 150 are illustrative and, in some embodiments, one or more of the components may be omitted and/or one or more other components may be part of semantic object 150 in addition to or instead of one or more of the components shown herein. For example, in some embodiments, one or more of content selection configuration 158*a*, analysis configuration 160, micro-planning configuration 162, surface realization configuration 164 and variable metadata 155 may not be included in a semantic object, which is why they are shown using dashed lines.

In some embodiments, the attributes 152 of semantic object 150 contain content to be rendered as a natural language text segment. Each of the attributes represents a respective piece of information that may be included in the natural language text segment generated from the semantic object. Each semantic object attribute may be thought as containing a piece of information that will occupy a text slot in the rendered natural language segment and, for that reason, a semantic object attribute may be termed as a "text slot" herein. Thus, the attributes of a semantic object may be rendered as portions of text in the segment generated from the semantic object using the techniques described herein. Examples of semantic object attributes are provided herein including with reference to FIGS. 2A and 3C.

In some embodiments, in addition to information specifying content, each of one or more of the attributes may include information indicating its semantic role (e.g., a part of speech or a relationship) in the natural language segment to be generated. For example, an attribute may include information indicating that it is a predicate, a noun phrase, a verb, a modifier (e.g., an adverb or adjective), another part of speech, and/or another type of role in a linguistic formalism. As another example, in some embodiments, one or more of the attributes may include information indicating its relationship with one or more other data attributes. For example, an attribute may indicate that it is to precede, or follow, or be rendered within a threshold number of words of another attribute. As another example, an attribute may indicate that it semantically related (e.g., that it is a modifier of, like an adjective) another attribute (e.g., a noun phrase).

A semantic object attribute may be a data attribute or a lexical attribute. Indeed, as shown in FIG. 1C, attributes 152 include data attributes 152*a* and lexical attributes 152*b*. Data attributes 152 are discussed first; a discussion of lexical attributes 152*b* follows. In some embodiments, a data attribute contains numeric information to be rendered as text. For example, a data attribute may contain numerical values representing quantities such as business data (e.g., profit, loss, revenue, percent increase of revenue, number of employees, etc.), dates (e.g., Feb. 21, 2032), time (e.g., 12:03:00), and any other type of value to be rendered as part of natural language text.

In some embodiments, content of one or more data attributes 152*a* may be obtained from business data obtained from a data store (e.g., business data store(s) 112) as described with reference to FIG. 1A. To this end, the semantic object may include one or multiple data variables 154 whose values may be assigned to the data values obtained from the data store. In turn, the values of a data variables 154 may be assigned directly to the values of data attributes 152*a* and/or the values may be used to perform various computations (e.g., mean, variance, clustering, classification, correlation, statistical calculation, etc.) and the results of these values may be assigned to the values of data attributes 152.

For example, the data variables of a semantic object for generating a natural language segment about any change in the profit of a company may include a variable indicating a starting value of (e.g., $50 million) representing a company's profit one year and another variable indicating an ending value (e.g., $75 million) representing the company's profit the following year. These values of these variables may be set from data obtained from one of the company's databases and used to calculate the percentage change (e.g., increase) in profit for the company (e.g., 50%). In turn, the semantic object may have a data attribute representing the percentage change in the profit of the company and its value will therefore be set to 50%. That value will be rendered as part of a natural language segment generated from the semantic object (e.g., "Company's profit increased by 50% from 2018 to 2019").

In some embodiments, one or more of the data variables 154 may be associated with metadata. The metadata for data variables 154 may be part of variable metadata 155. The metadata for a data variable may include any suitable type of metadata including, but not limited to, metadata indicating origin of the data (e.g., when it was created, who created it, what system it was obtained from, when it was edited, etc.), subjective importance of the data (e.g., "critical", "important", "normal"), and/or any other suitable type of metadata. Such metadata may be used in analyses performed on the data. For example, data that is not sufficiently recent (e.g., not updated within a threshold amount of time) may be omitted from a calculation.

In some embodiments, the analysis configuration 160 specifies the analysis and/or calculations to be performed on the values of data variables. As described above, the results of such calculations may be assigned to data attributes 152*a*, which in turn may be rendered as natural language text. Non-limiting examples of analyses include statistical calculations (e.g., mean, media, variance, confidence intervals and/or any other suitable statistical calculation), time series calculations (e.g., finding maximum or minimum in a time series, finding outliers relative to a baseline, finding the level of volatility/consistency of variation of the data in a given time period, machine learning calculations (e.g., clustering, classification, prediction, etc.), finding the contribution of different variables in a formula (e.g., via partial derivatives), inference, and/or any other suitable calculation or calculation(s), as aspects of the technology described herein are not limited in this respect. Any suitable mathematical software library or libraries may be used by NLG system 101 to perform the calculations. In some embodiments, the analysis configuration 160 may be specified using a mark-up language such as the Predictive Model Markup Language (PMML) or any other suitable mark-up language.

Returning to lexical attributes 152, a lexical attribute represents, at an abstract level, a chunk of text to be rendered into a natural language segment. The abstract representation of text by a lexical attribute may be transformed into actual text by using vocabulary 156, which contains text strings (e.g., words) that may be used to realize the lexical attribute as natural language in the rendered segment.

Figure 2D:
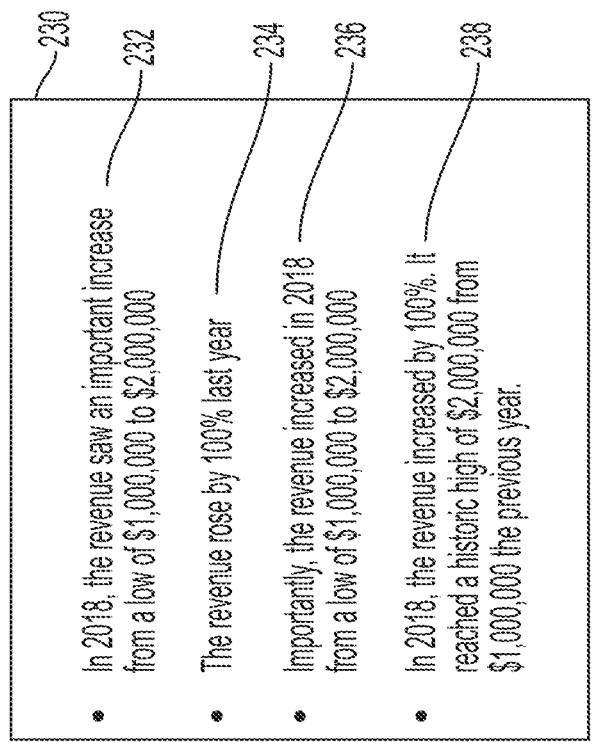
FIG. 2D illustrates example natural language segments that may be generated using the semantic object 200, in accordance with some embodiments of the technology described herein.

For example, as shown in FIG. 2B, a lexical attribute 210c representing the concept of an entity (e.g., the thing that the natural language segment will be talking about) may be associated with the vocabulary 212c containing the text strings: "revenue" and "profit", such that the generated segments describe something about the revenue or profit of a company. As another example, as shown in FIG. 2B, a lexical attribute 210d representing the concept of "variation" or change may be associated with the vocabulary 212d containing the text strings: "increase", "decrease", "a growth", "a fall", "a stagnation", "to go down", "a drop", and "to see an increase". As yet another example, as shown in FIG. 2B, a lexical attribute 210e representing the concept of "variation intensity" may be associated with the vocabulary 212e containing the text strings: "important", "high", "disappointing", "excellent", and "low", which are adjectives that may be used to describe the variation associated with the entity. Such vocabulary strings, once substituted for the lexical attributes and put through the various stages of the NLG pipeline, may lead to the generation of sentences such as "In 2018, the revenue saw an important increase from a low of 1,000,000 to 2,000,000",as shown in FIG. 2D.

FIG. 1D is a diagram of an example vocabulary 156 for the semantic object 150 of FIG. 1C. As shown in FIG. 1D, vocabulary 156 includes lexical attributes A, B, C, labeled as 160a, 160b, and 160c, respectively. Attribute 160a is associated with respective metadata 165a having text stings 162a and syntactic type information 164a. Attribute 160b is associated with respective metadata 165b having text stings 162b and syntactic type information 164b. Attribute 160c is associated with respective metadata 165c having text stings 162c and syntactic type information 164c. Examples of text strings are provided herein. The syntactic type information may be information indicating the part of speech for the text strings (e.g., noun, verb, adjective, adverb, etc.). Examples of syntactic type information are shown herein including in FIG. 2B.

A semantic object may include any suitable number of attributes, as aspects of the technology described herein are not limited in this respect. This applies to data attributes and lexical attributes. For example, although in the embodiment of FIG. 1D, the vocabulary 156 is shown as having entries for three lexical attributes, a semantic object may have any suitable number of lexical attributes and the vocabulary 156 may include entries for all such lexical attributes.

As shown in FIG. 1D, entries in vocabulary for a semantic object may comprise (identifier, metadata) pairs, each identifier identifying a respective lexical attribute and the metadata containing text strings and, optionally (as indicated by dashed lines in the figure), syntactic type information for the lexical attribute. While, in some embodiments, vocabulary entries may be stored as paired data, in other embodiments the vocabulary entries may be stored in any other suitable way (e.g., as records in a database, using a mark-up language) in any suitable format and/or using any suitable data structure(s), as aspects of the technology described herein are not limited in this respect.

In some embodiments, the attributes 152 of a semantic object 150 may be processed through a series of stages to generate a natural language text segments. For example, in order to obtain values for the data attributes 152a, data may be obtained from one or more external sources and processed using analysis configuration 160. Next, a first intermediate representation of the semantic object may be generated using the attributes 152 and document plan configuration 158 in the document planning stage. Next, a second intermediate representation of the semantic object may be generated using the first intermediate representation, the vocabulary 156 and micro-planning configuration 162 during the microplanning stage. Finally, the natural language segment may be obtained from the second intermediate representation using the surface realization configuration 164 during the surface realization stage.

As shown in FIG. 1C, in some embodiments, the document plan configuration includes content selection configuration 158a and document structure configuration 158b. The content selection configuration 158a may indicate which ones of the attributes 152 of the semantic object are to be used in generating a natural language text segment. The configuration 158a may indicate that some or all of attributes 152 may be used.

In some embodiments, the document structure configuration 158b may include information used by the NLG system to determine how the content of the semantic attributes 152 is to be organized into the natural language text segment generated from the semantic object 150. The document structure configuration 158b may include a list of one or multiple options describing different structures for the natural language text segment generated from the semantic object 150. For example, document structure configuration 158b may include information specifying an order in which some or all of the semantic object attributes 152 are to appear in the natural language text segment, when rendered. For example, document structure configuration 58b may include a data structure (e.g., a semantic tree) describing relationship among the attributes. As another example, document structure configuration 158b may include information specifying a rhetorical relationship (e.g., a cause and effect) relationship between semantic attributes of a single semantic object or between multiple semantic objects. The document structure configuration 158b may be specified using in any suitable way and in any suitable format, for example, by using a mark-up language, examples of which are provided herein. Examples of document structure configuration 158b are described herein including with reference to FIG. 2A, 2E, 3D, 5A, and 5C.

In the illustrative embodiment of FIGS. 1A-1D, document macro structure(s) 120 and document plan configuration 158 are separate from one another. In this embodiment, the document macro structure(s) 120 specifies structure of the overall document to be created from segments obtained from respective semantic objects (e.g., titles, sections, chapters, paragraphs, order of segments generated from semantic objects), but does not specify the structure of the text within each segment. On the other hand, the document plan configuration 158 specifies, for a semantic object, the structure of the text segment generated from the semantic object. However, in other embodiments, the information relating to macro-structure (part of document macro structure(s) 120 in this embodiment) and information relating to micro-structure (part of document plan configuration 158) need not be separated and may be part of a single configuration or may be split up into multiple other configurations, in any suitable way, as aspects of the technology described herein are not limited in this respect.

In some embodiments, micro-planning configuration 162 may include information to be used during the micro-planning stage of generating natural language text from semantic object 150. In some embodiments, this information may include information for controlling aggregation, word order, generating referential expressions, any information used by the software tool(s) of NLG software tools 128 used to perform micro-planning, and/or any other suitable information used to control the manner in which micro-planning is performed.

In some embodiments, surface realization configuration 164 may include information to be used during the surface realization stage of generating natural language text from semantic object 150. In some embodiments, this information may include information for specifying formats of numbers, dates, capitalization, any information used by the software tool(s) of NLG software tools 128 used to perform surface realization, and/or any other suitable information used to control the manner in which surface realization is performed.

Semantic Object Example #1

FIG. 2A is a diagram of an illustrative semantic object 200 having attributes 202, data variables 204, a vocabulary 206, and a document structure configuration 208, in accordance with some embodiments of the technology described herein. The example semantic object 200 may be used to generate text describing the variation of a numerical value (e.g., revenue of a company, height of a person, temperature outside, score in a game, etc.) over time.

As shown in FIG. 2A, data variables 204 include a numerical value V1, a date D1 associated with value V1, a numerical value V2, and a date D2 associated with value V2, where the date D2 is later date than the date DE The attributes 202 include data attributes 202a corresponding to the data variables. In particular, the data attributes 202a START VALUE, START DATE, END VALUE, and END VALUE may be assigned the values V1, D1, V2, and D2, respectively.

The attributes 202 also include lexical attributes 202b including the VARIATION attribute representing a change—the main predicate in this example, the ENTITY attribute representing the entity whose value is changing over time, the VARIATION INTENSITY, START INTENSITY and END INTENSITY modifiers, which may be rendered as adjectives modifying the VARIATION, the START VALUE, and the END VALUE.

As shown in FIG. 2A, document structure configuration 208 describes how the various attributes are related. In this example, the document structure configuration 208 is specified as a semantic tree specifying relationships among the attributes as follows:

```
VARIATION_INTENSITY (
    VARIATION (
        ENTITY
        START_VALUE_INTENSITY (START_VALUE)
        END_VALUE_INTENSITY (END_VALUE)
    )
)
```

In this representation, the convention is that children of a node are between parentheses to the right of the node. The semantic convention is that modifiers have their modifiee as child node, and that the predicate has its arguments as child nodes.

FIG. 2B is a diagram of an example vocabulary 206 that may be used when rendering the attributes 202 for the semantic object 200 of FIG. 2A, in accordance with some embodiments of the technology described herein. Entries in vocabulary 206 comprise (identifier, metadata) pairs including pairs: (210a, 212a), (210b, 212b), (210c, 212c), (210d, 212d), (210e, 212e). The metadata may include information describing: text options that may be used to render attributes as text, associated parts of speech, and rules for the text options that are available for rendering text (not shown).

For example, pair (210a, 212a) indicates that the attribute START VALUE is of type "Currency" and the pair (210b, 212b) indicates that the attribute START DATE is of type "Date Year". These value types may be used by the NLG system 101 (e.g., using NLG software tools to perform micro-planning and/or surface realization) to appropriately render these values into text having the format appropriate for currencies and dates. As another example, pair (210c, 212c) indicates that the ENTITY attribute may be rendered using the text strings: "revenue" or "profit". The metadata 212c further indicates that the syntactic type of "ENTITY" is noun. As another example, pair (210d, 212d) indicates that the main predicate VARIATION may be rendered using the text strings: "increase", "decrease", "stagnate", "a growth", "a fall", "a stagnation", "to go down", "a drop", "to see an increase". The metadata 212d further indicates that the syntactic type of VARIATION is "verb". As yet another example, pair (210e, 212e) indicates that the VARIATION INTENSITY attribute may be rendered using the text strings: "important", "high", "disappointing", "excellent", and "low." The metadata 212e further indicates that the syntactic type of VARIATION INTENSITY is "adjective". Although not shown, vocabulary 206 may include analogous entries for any other attributes part of attributes 202 (e.g., START VALUE INTENSITY, END VALUE INTENSITY, etc.).

In addition, although not shown in FIG. 2B, vocabulary 206 may include rules specifying which text strings are available for use in rendering the attributes with which they are associated. The rules may be used to constrain the available options depending on the values of the data variables 204. For example, if value V1 is lower than value V2, the text strings "increase", "a growth", "to see an increase" may be selected, but text strings such as "decrease", "a fall" and "to see a decrease" will not be selected. Similarly, rules may be added to control the textual objects available for modifiers depending on the value of the data variables.

To illustrate the types of natural language text segments that may be generated using semantic object 200, let us suppose that the data variables 204 are set as shown in panel 220 of FIG. 2C. In particular, the values V1, D1, V2, and D2 are set to values "1,000,000", "01/01/2018", "2,000,000", and "01/01/2019," respectively. With these values and other configurations part of semantic object 200, including those described in FIG. 2A, the natural language segments shown in FIG. 2D may be generated. For example, the following sentence 232 may be generated: "In 2018, the revenue saw an important increase from a low of 1,000,000 to 2,000,000 may be generated." Alternatively, the sentence 236 could be generated: "Importantly, the revenue increased in 2018 from a low of $1,000,000 to $2,000,000".

As described herein, semantic objects may be easily customized by adding or removing configurations. For example, an analysis configuration may be added to semantic object 200 for the computation of a percentage of change in order to generate sentences like sentence of 234, "The revenue rose by 100% last year". As another example, a micro-planning configuration may be added to control word order to select from among segments such as "In 2018, the revenue increased" and "The revenue increased in 2018". As yet another example, a micro-planning configuration may be added to separate text into several sentences to produce a segment such as sentences 238, "In 2018, the revenue increased by 10%. It reached a historic high of 2,000,000 from 1,000,000 the previous year." As yet another example, a surface realization configuration may be added to customize the data format, the currency format, or to present the currency in a currency other than dollars (e.g., Euros).

Combinations of Semantic Objects

As described herein, natural language segments generated from different semantic objects may be placed next to each other in the overall document. Such ordering constraints may be specified by a document plan (e.g., in document macro structure(s) 120). In this type of combination, data in one semantic object does not impact the natural language text segment generated using another semantic object. For example, two semantic objects may be used to generate two different sentences that, when placed next to each other, results in the following text:

"The benefits increased substantially since last year. Costs dropped significantly."

However, in some embodiments, semantic objects may be combined in other ways, such that the combination has an impact on the generated text segment. To this end, in some embodiments, multiple semantic objects may be composed into an extended semantic object, which may be used to facilitate automated generation of sentence structures having greater complexity.

In some embodiments, multiple semantic objects may be combined by: (1) combining the data variables of the different semantic objects into a single set of data variables; (2) combining the attributes of the different semantic objects into a single set of attributes; and/or (3) combining the vocabularies of the different semantic objects into a single vocabulary.

In some embodiments, the document structure configurations of the semantic objects may be combined to generate a document structure configuration for the extended semantic object by adding a new attribute representing a rhetorical relationship between the segments represented by constituent semantic objects and using the new attribute when rendering the extended semantic object obtained through this composition into text. In this way, intermediate representations generated from individual semantic objects during the document planning stage of NLG may be composed to obtain a composed intermediate representation, which is then provided as input to subsequent NLG stages (e.g., lexicalization, aggregation, referential expression generation, and surface realization).

For example, in some embodiments, it is possible to combine two semantic objects with a neutral "join" relationship (e.g., by adding an attribute representing the "JOIN" relationship to the extended semantic object or in any other suitable way) to merge the previously separate sentences into a single one. In this way, sentences such as following sentences may be obtained:

"The benefits increased notably since last year and costs dropped significantly"

"The benefits increased notably since last year while costs dropped significantly"

As another example, in some embodiments, it is possible to combine two semantic objects using a causal relationship (e.g., by adding a new CAUSE attribute to the extended semantic object or in any other suitable way) to merge the previously separate sentences into a single one. In this way, sentences such as the following sentences may be obtained:

"The benefits increased notably since last year because costs dropped significantly"

"The benefits increased notably since last year as costs dropped significantly"

"The benefits increased notably since last year because of the significant drop in costs"

"Costs dropped significantly, resulting in an important increase in benefits since last year"

The last two sentences in the above example illustrate the challenge of combining sentences. In order to link sentences with a causal relationship such as "because of" or "resulting in", the syntactic type of some of the elements in the sentences have to be modified. For example, the verbs "increased" and "dropped" may be changed to the noun phrases "an increase" and "a drop", respectively. As another example, the adverbs "importantly" and "significantly" are transformed into the adjectives "important" an "significant", respectively.

In some embodiments, these types of syntactic changes may be implemented using the NLG software tools 128 when they have the compositionality property. The compositionality property ensures that when semantic objects are combined together, the output text is syntactically correct. For example, NLG software tools 128 that use the tree adjoining grammars (TAG), allows for syntactic constraints to be attached to words and groups of words so that the NLG system can choose, reorder, and/or combine the words together while making sure that the generated text is syntactically valid. Other syntactic formalisms such as feature unification grammars (FUG), context free grammars (CFG), etc. may be used.

Composing semantic objects using a causal relationship may be applied in context of the example semantic object 200 described above with reference to FIGS. 2A-2D. This example shows how to combine two semantic objects describing the variation of a numerical value together by a causal relationship. The combined semantic object may be obtained by combining the data variables, attributes, and vocabularies of two constituent semantic objects and adding: (1) a new CAUSE attribute to the combined set of attributes; and (2) a corresponding entry into the combined vocabulary including text strings that may be used to render the CAUSE attribute into text such as, for example, the text strings "to be caused by", "because of", and "as a result of". The document structure configuration may be updated as well resulting in the document structure configuration 240, shown in FIG. 2E, for the combined semantic object.

The resulting combined semantic object may be used to generate sentences such as sentence 242, shown in FIG. 2F: "As a result of the increase in costs in 2018, benefits declined during the same period." In this example "costs" and "benefits" are given by vocabularies associated with the ENTITY attributes of each constituent semantic object. As described above, rendering of the combined semantic object into natural language text may rely on the compositionality of the document structure configurations (e.g., using semantic trees), which ensures that only combinations of vocabularies that lead to syntactically valid sentences are generated.

Semantic Object Example #2

Another example of a semantic object is described with reference to FIGS. 3A-3F, which show various example components of its specification. Like the semantic object 200 of Example #1, this semantic object also may be used to generate natural language segments describing the variation of an entity over a time period. Examples of natural language text segments that may be generated using the specification of the semantic object are described herein including with reference to FIGS. 4A-4J.

FIG. 3A illustrates the specification 300 of the data variables of the semantic object in this example. As shown in FIG. 3A, the semantic object includes four data variables: variables 302 and 303 representing two numeric values ("first_dp" and "second_dp") and variables 304 and 305 representing two dates ("first_date" and "second_date").

FIG. 3B illustrates the analysis configuration 310 of the semantic object in this example. The analysis configuration defines three analyses: 312, 314, and 316 that may be performed on the data variables shown in FIG. 3A. For example, analysis 312 may be used to determine the difference between the values of variables 302 and 303. As another example, analysis 314 may be used to determine the percent change between the values represented by variables 302 and 303. As another example, analysis 316 may be used to determine the duration of the time period between the dates represented by variables 304 and 305.

FIG. 3C illustrates the attributes 320 of the semantic object in this example. As shown in FIG. 3C, attributes 320 include four data attributes 321, 322, 323, and 324, and four lexical attributes 325, 326, 327, and 328. Data attributes 321 and 322 correspond to the values of data variables 302 and 303, respectively. Data attributes 323 and 324 correspond to the output of analyses 14 and 316, respectively. Attribute 325 represents the entity (e.g., "revenue" or "profit" or "sales", etc.) whose variation the generated natural language text segment will be describing. The attribute 326 represents the type of variation (e.g., "increase", "decrease", etc.) that the generated segment will be describing. The attributes 327 and 328 represent modifiers (e.g., adjectives or adverbs) of the variation as a whole and at the end date, respectively.

FIG. 3D illustrates the document structure configuration 330 of the semantic object in this example. As shown in FIG. 3D, the document structure configuration 330 includes two document structure configurations 332 and 334, either one of which may be used to generate natural language segments from the semantic object. These document structure configurations may give rise to text segments having structure. For example, configuration 332 may give rise to a sentence structured as: "In YYYY, the revenue increased substantially from X to a high of Y." On the other hand, configuration 334 may give rise to a sentence structured as: "In YYYY, the high revenue of $Y increased substantially from $X".

FIG. 3E illustrates the vocabulary 340 of the semantic object in this example. As shown in FIG. 3E, the vocabulary 340 has entries for the various attributes shown in FIG. 3C. Entries 341, 342, 343, 344 correspond to the data attributes 321, 322, 323, and 324, respectively. Entries 345, 346, 347, and 348 correspond to the lexical attributes 325, 326, 327, and 328, respectively. Each of the entries includes information that may be used to render the corresponding attribute into text. For example, entries corresponding to data attributes include information for rendering numbers into text including information about the precision, scale, format, units, and/or currency for the numbers. As another example, entries corresponding to lexical attributes include text strings (e.g., for roots of the words to be used to render the attribute into text), part-of speech information (e.g., "Verb", "Noun Phrase", "Adverb", "Adjective") and other information.

FIG. 3F illustrates the micro-planning configuration 350 of the semantic object in this example. The micro-planning configuration 350 includes options to be used during the aggregation stage of natural language generation.

An NLG system (e.g., system 101) may be used to generate various types of sentences depending on the values of the data points. For example, the following sentences could be generated:

"In 2018, the revenue increased importantly from $10M to a high of $28M"

"The revenue of $28M increased importantly from $10M last year"

"Since last year, the revenue increased importantly from $10M to a high of $28M"

"In 2018, the revenue decreased importantly from $28M to $10M"

"The revenue of 1$0M decreased importantly from $28M last year"

Depending on the context in which the semantic object used, relative to segments generated using other semantic object, the following variations are also possible:

1. Generation of a natural language text segment as a noun phrase so that the segment may be used as a subject or a clause (e.g., "despite the important growth . . . ")

"the important growth of the revenue from $10M to a high of $28M in 2018"

"the important drop of the revenue from $28M to $10M in 2018"

2. Combination of the subject with the subject of another semantic object sharing the same object. In the example sentence below, the parentheses indicate content from the other semantic object.

"(Both) the revenue (and profits) increased importantly since last year."

3. Generation of the segment as an anaphora to be used as a subject or clause. In the example sentence below, the parentheses indicate content from the other semantic object.

"Despite (this decrease) profits increased by 5%"

Aspects of how to generate natural language text segments from the semantic object of FIGS. 3A-3F are described herein including below with reference to FIGS. 4A-4J.

Illustrative Methods

Figure 4A:
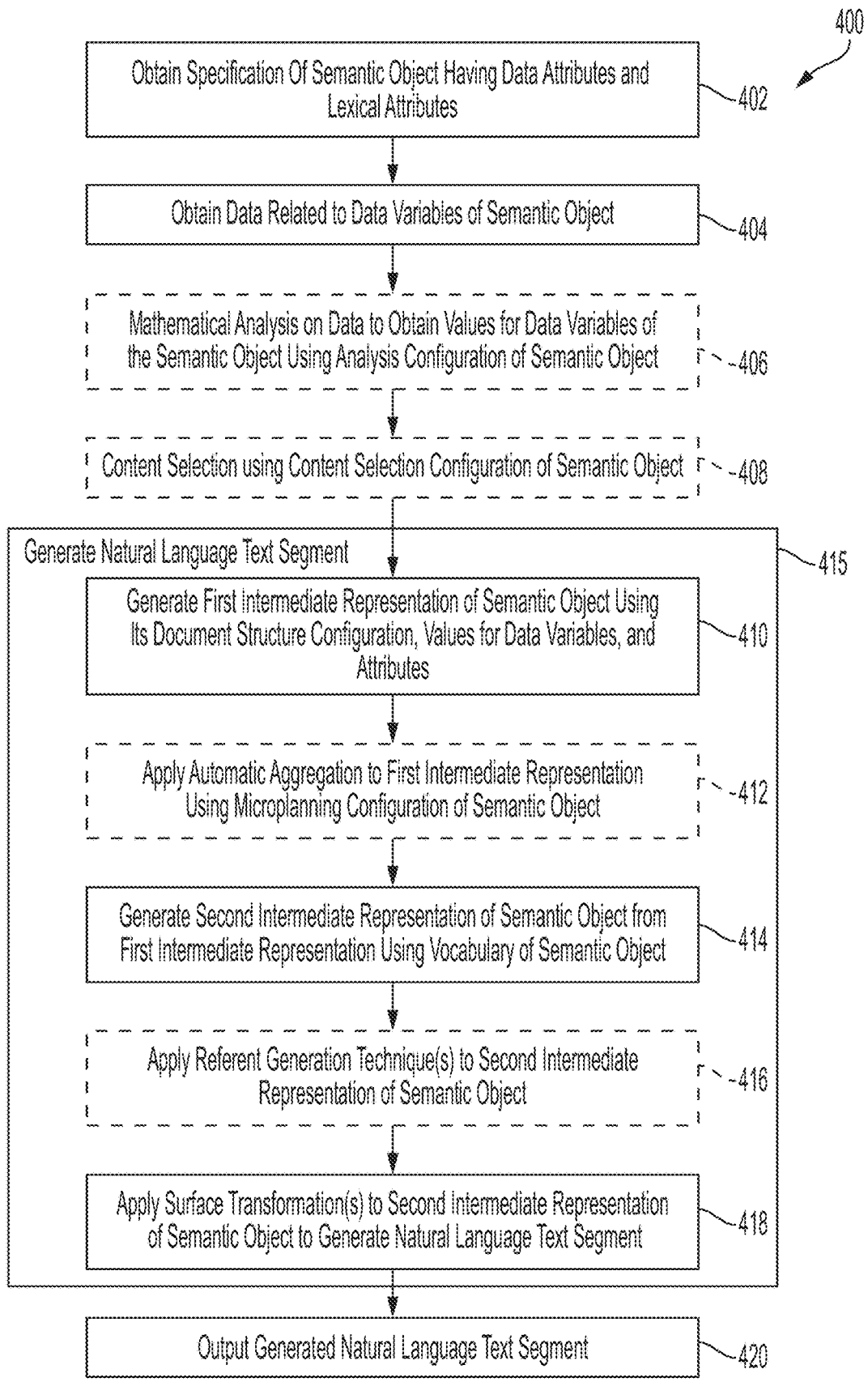
FIG. 4A is a flowchart of an illustrative process 400 for generating natural language text using one or more semantic objects, in accordance with some embodiments of the technology described herein.

FIG. 4A is a flowchart of an illustrative process 400 for generating natural language text using one or more semantic objects, in accordance with some embodiments of the technology described herein. The process 400 may be performed by any suitable natural language generation system and, for example, may be performed by NLG system 101 described with reference to FIGS. 1A-1D. Aspects of process 400 are described herein with reference to the semantic object specification shown in FIGS. 3A-3F.

Process 400 begins at act 402, where the specification of a semantic object is obtained. The specification may be obtained from any suitable source (e.g., semantic object data store 140, a configuration file or files, etc.). The specification may be in any suitable format. For example, the specification may be specified using a mark-up language such as YAML or any other suitable mark-up language including any other mark-up language described herein. As one example, the specification of the semantic object shown in FIGS. 3A-3F may be accessed at act 402.

In some embodiments, the specification accessed at act 402 may be used to instantiate one or more variables and/or initialize one or more data structures in the memory of the system executing process 400 in preparation for the subsequent steps of natural language generation. For example, a data structure may be generated to represent one or more of the document plan configurations in the specification. As another example, variables corresponding to the data variables may be instantiated.

Next, at act 404, data related to the data variables of the semantic object may be accessed. These data may be accessed from any suitable source. In some embodiments, at least some of the data may be accessed from a system external the NLG system (e.g., business data store(s) 112 described with reference to FIG. 1). In other embodiments, at least some of the data may be provided to the NLG system in a configuration file, a function call, or in any other suitable way. An example of data that may be accessed during act 404 is illustrated in FIG. 4B, which shows example values for the variables 302, 303, 304, and 305 shown in FIG. 3A.

Next, at act 406, one or more mathematical analyses on the data obtained at act 404 may be performed. In some embodiments, the computations performed at act 406 may be specified by the analysis configuration (e.g., 160) of the semantic object. For example, with reference to the example of FIGS. 3A-3F, the mathematical analyses specified in analysis configuration 310 may performed, at act 406, on the data obtained at act 404. The results of these calculation are shown in FIG. 4C and include values of the absolute difference between the starting and ending value (50), the percentage of increase that it represents (100%) and the period of analysis (the year 2018).

Next, at act 408, a content selection configuration may be used to perform content selection by selecting only a subset of the attributes of the semantic object to be used for generating the natural language text segment. In some embodiments, the content selection configuration may include Boolean variables indicating whether respective attributes are to be included. For example, in some embodiments, a content selection configuration may indicate that a modifier attributes is to be omitted so that instead of a generated segment stating "Revenue increased significantly in 2019 by 20M", the generated segment states "Revenue increased in 2019 by 20M", without the editorializing. A content selection configuration may indicate which attributes to include, which attributes to exclude, or both which to include and which to exclude. A content selection configuration may specify whether to include and/or exclude each of the attributes or may specify this for only a subset of the attributes. When a content selection configuration is omitted, all attributes may be used.

Next, process 400 proceeds to act 415 during which a natural language text segment is generated using the semantic object whose specification was accessed during act 402, the data obtained at act 404, the results of any calculations performed on these data at act 406, and the selection of any attributes of interest. Act 415 includes multiple stages: (1) generating a first intermediate representation of the semantic object at act 410; (2) applying automatic aggregation to the first intermediate representation at act 412; (3) generating a second intermediate representation of the semantic object from the first intermediate representation of the semantic object using the vocabulary of the semantic object at act 414; (4) applying referent generation technique(s) to the second intermediate representation of the semantic object at act 416; and (5) applying surface transformation(s) to the second intermediate representation of the semantic object to generate the natural language text segment at act 418. After the natural language text segment is generated at act 415, the natural language segment may be output at act 420 (e.g., for use by the NLG system to insert into a larger set of natural language text being generated, for example, a document; sent to a remote user, sent to a content management system, stored in non-transitory memory for subsequent access, etc.). Acts 410, 412, 414, 416, and 418 are further described next.

As described above, at act 410, the first intermediate representation of the semantic object is generated using its document structure configuration, values for data variables, and attributes (both data and lexical attributes). For example, as shown in FIG. 4D, document structure configuration 332 may be selected from among the options in configuration 330 shown in FIG. 3D. In turn, numeric values and/or lexical data may be substituted in for the attributes as shown in FIG. 4E.

As shown in FIG. 4E, the values of data variables are put in place of the data attributes (e.g., the value "2018" replaces the data attribute "period", the value "50" replaces the data attribute "start_value", the value "100" replaces the data attribute "end_value").

Data in vocabulary entries (shown in FIG. 3E) are substituted for the lexical attributes (e.g., "important" is substituted for the lexical attribute "variation intensity", "increase" is substituted for the lexical attribute "variation_predicate", "revenue" is substituted for the lexical attribute "entity", and "high" is substituted for lexical attribute "end_value_intensity". It should be noted that although the language being inserted for the lexical attributes does not necessarily represent the final text strings to be rendered in the output natural language text segment. Multiple processing steps may modify the language inserted at this stage (e.g., changing part of speech: from "important" to "importantly", conjugation of verbs: from "increase" to "increased" or "increasing", and various other changes).

As may be appreciated from the foregoing, in some embodiments, the document planning phase may be implemented using document structure templates (e.g., as shown in FIG. 4D), which may include one or more optional elements. FIG. 5A shows another example of a document structure configuration, in which variables are represented by a $ sign. From this representation, the first intermediate representation may be obtained through substitution, for example as shown in FIG. 5B.

In some embodiments, a document structure configuration may be specified using a schema, which may be a template augmented with regular or context free grammar mechanisms, possible with conditional statements as well. For example, the template of FIG. 5A may be augmented to obtain the schema shown in FIG. 5C. This schema includes the element "for each: analysis.contributors", which specifies that the "cause" block is to be repeated for each contributor to the consequence variation detected by the analysis.

Next, process 400 proceeds to act 412 where automatic aggregation is applied to the first intermediate representation. In some embodiments, automatic aggregation may be used to compose the first intermediate representation with an intermediate representation of another semantic object. For example, as shown in FIG. 4F, the semantic object attribute "entity" has been replaced with an attribute "join" itself references two indicators: "indicator" and "other_indicator". This may result in more complex sentences such as "In 2019, both the profit and revenue increased by 50%". Although, in some embodiments, such joining may be specified using rules in a document plan, in other embodiments, opportunities to join (or otherwise rhetorically connect) semantic objects may be discovered using pattern recognition techniques and/or rules during the aggregation stage.

For example, in some embodiments, the NLG system performing process 400 may define rules of the form "pattern →replacement". The "pattern" is a semantic structure pattern and the "replacement" is another semantic structure pattern that should replace the left-hand side of the rule. In some such embodiments, the aggregation procedure may be performed using the following search procedure:
1. Try to match every left hand side of every rule with the semantic structure produced by the document planning step (e.g., output of act 410).
2. Pick one of the rules that matched and replace the semantic structure that matched its left hand side by the right hand side of the rule
3. Loop back to act 1 until no more rules match the semantic structure.

The order in which rules are considered may be specified in advance so that the search procedure terminates and is performed efficiently. In some embodiments, the aggregation rules may be built into the NLG system 101. Additionally or alternatively, the aggregation rules may be specified as part of one or more semantic objects, for example, in their microplanning configuration (e.g., micro-planning configurations 162 and 350).

Next, process 400 proceeds to act 414, where a second intermediate representation of semantic object is generated from the first intermediate representation using the vocabulary of semantic object. This processing corresponds to the lexicalization stage of natural language generation. In some embodiments, generating the second intermediate representation from the first intermediate representation comprises generating a structure (e.g., string) annotated with syntactic and/or morphological information. For example, as shown in FIGS. 4E and 4G, the first intermediate representation shown in FIG. 4E may be transformed to the second intermediate representation shown in FIG. 4E shown in FIG. 4G ("in 2019, <revenue> <to_increase> importantly from <50> to a high <100>"). The lexicalization stage may be performed using any of numerous types of lexicalization techniques. In some embodiments, lexicalization may be performed using one or more grammars, for example, one or more abstract categorical grammars (ACGs), tree adjoining grammars (TAGs), context free grammars (CFGs), functional identification grammars (FIGs), any other suitable grammars, and/or in any other suitable way.

As one non-limiting example, in some of the embodiments in which abstract categorical grammars are used to perform lexicalization, the second intermediate representation may be generated from the first intermediate representation using the following algorithm:
1. Create an abstract categorical grammar (ACG) by combining the other created semantic objects in the document structure with the structures instantiated for the semantic object whose specification was accessed at act 400.
2. Create a Datalog program from the resulting ACG. This may be done in any suitable way and, for example, may be done using the techniques described in the article "Parsing and Generation as Datalog Queries", Makoto Kanazawa, Proceedings of the 45th Annual Meeting of the Association of Computational Linguistics pp. 176-183, which is incorporated by reference herein in its entirety.
3. Execute the Datalog query using any suitable Datalog engine to generate one or more proofs.
4. Convert the resulting proof(s) into an ACG representation and convert the ACG representation into the second intermediate representation containing a string annotated with syntactic and/or morphological information.

Any of numerous available NLG software and/or database tools may be used to perform one or more of the above-describes steps. Although, in some embodiments, ACGs may be used (e.g., due to compositionality and computational efficiency afforded by this approach), other approaches (e.g., TAGs, CFGs, etc.) may be used in some embodiments, as aspects of the technology described herein are not limited in this respect. In some embodiments, although the lexicalization stage may be configured to produce different outputs. In some such embodiments, one of the options may be selected using any suitable criteria such as, for example, minimizing redundancy and/or repetition with text already written).

Next, process 400 proceeds to act 416 where referent generation techniques are applied to the second intermediate representation of semantic object. In this step, long range dependencies in the text may be resolved in order to reference entities and use anaphoric expressions instead of referential expressions, where possible.

For example, in some embodiments, for each entity reference in the second intermediate representation the following acts may be performed:
1. Choose whether to express the entity as "referential expression" (e.g., "revenue", "profits", "company") or as an "anaphoric expression" (e.g., "it", "they", this". For instance, the first time an entity is referenced in the text, a referential expression may be used, whereas for subsequent mentions of the entity (e.g., within a threshold number of characters of the first reference), anaphoric expressions may be used.
2. When an expression for an entity is generated, it should be generated so that the expression is minimal and unambiguous. For instance, if generated text is to reference the profit of a company in different countries, the expression should identify the countries to be unambiguous (e.g., "the company's profit in France", "the company's profit in Belgium", etc.)
3. When it is determined that an anaphoric expression is to be used, the appropriate anaphoric expression selected based on characteristics of the entity (e.g., gender, number) and the characteristics of the previous referential and/or anaphoric expressions used. Aspects of selecting referential and anaphoric expressions are further described in U.S. Pat. No. 9,582,501, titled "Techniques for Generation of Natural Language Text", granted on Feb. 28, 2017, which is incorporated by reference herein in its entirety.

Continuing with the example, suppose that the semantic object of FIGS. 3A-3F is used to generate the second intermediate representation (b) that appears in the overall document being generated between two segments whose respective second intermediate representations (a) and (c) are shown below:
(a) in 2017, <revenue> <to_decrease>from <70> to <50>.
(b) in 2018, <revenue> <to_increase>from <50> to a high <100>.
(c) in 2018, <revenue_US> <to increase> from <30> to <50>.

These second intermediate representations (also shown in FIG. 4H) may be processed, at act 416, to create the strings shown in FIG. 4I. As shown in FIG. 4I, an anaphoric expression ("it") has been selected to refer to the "revenue". On the other hand, a referential expression, rather than an anaphoric expression, is selected to describe US revenues to disambiguate this quantity from the overall revenue previously mentioned.

Next, process 400 proceeds to act 418, where one or multiple surface transformations are applied to the second intermediate representation of semantic object to generate natural language text. This involves the application of various formatting and/or morphological rules to produce the final sentences such as the sentences shown in FIG. 4J.

In some embodiments, surface transformations (e.g., number agreement, contractions, capitalization, formatting, etc.) may be implemented using regular expressions and/or context free grammars For example, in some embodiments, the following procedure may be employed:

1. Using syntactic annotation in the second intermediate representation, transform each word into its final surface form having the right tense, number, gender, case, etc.
2. Apply contraction rules (e.g., using regular expressions).
3. Insert formatting elements (e.g., HTML tags).
4. Output the result.

Of course, it should be appreciated that any other suitable type(s) of surface realization techniques may be used, as aspects of the technology described herein are not limited in this respect.

It should be appreciated that process 400 is illustrative and that there are variations thereof. For example, in some embodiments, one or more of the acts shown in dashed lines may be omitted. That is, in some embodiments, one or more of acts 406 (mathematical analysis), 408 (content selection), 412 (automatic aggregation), and 416 (referent generation) may be omitted. In some embodiments, the determination as to whether any one or more of these acts is to be omitted may be made automatically based on the specification of the semantic object. When the specification of a semantic object does not include a configuration for a particular act (e.g., a mathematical analysis configuration) that act may be omitted (e.g., no mathematical calculations on the received data are performed).

Figure 6:
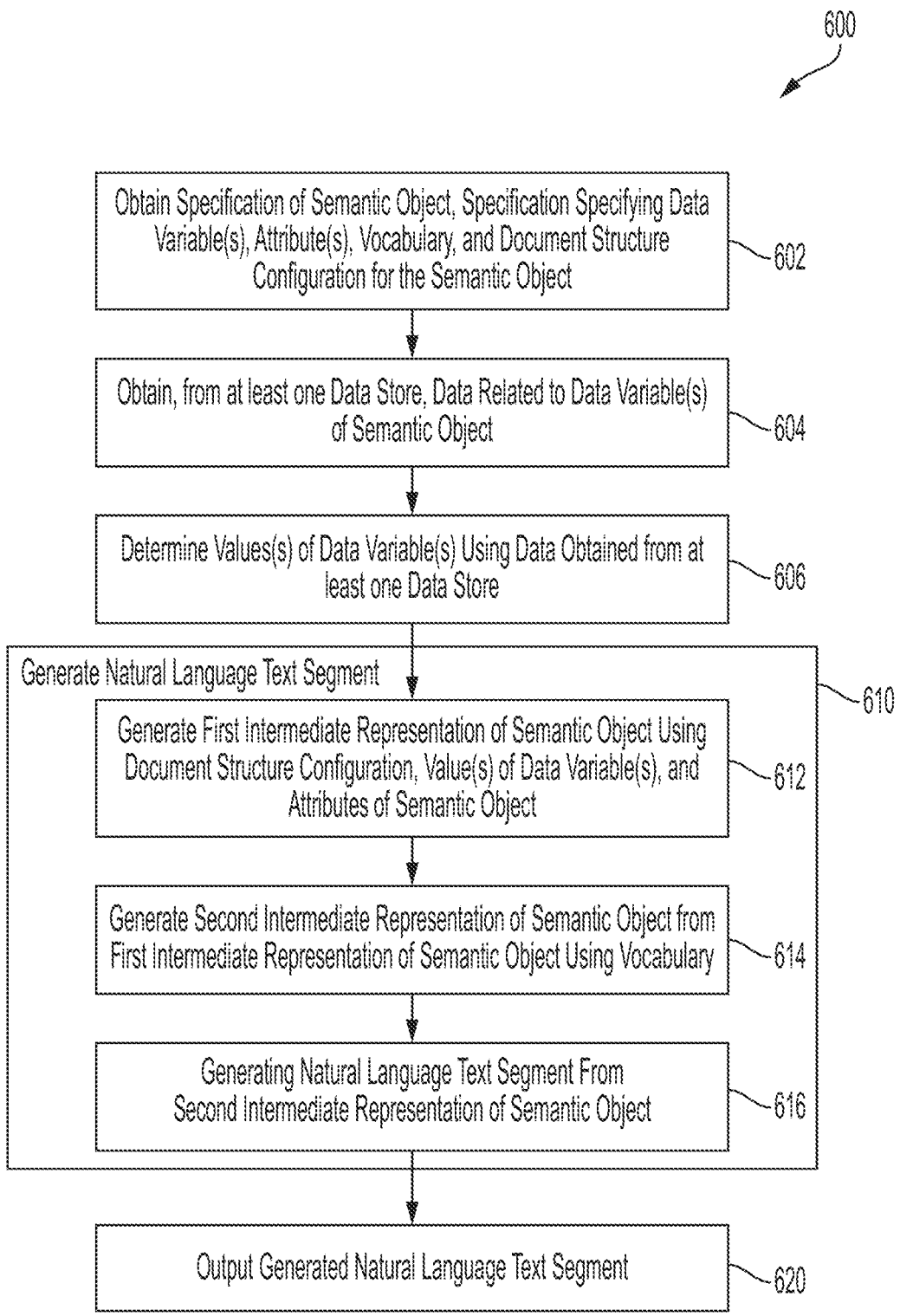
FIG. 6 is a flowchart of an illustrative process 600 for generating natural language text using one or multiple semantic objects, in accordance with some embodiments of the technology described herein.

FIG. 6 is a flowchart of an illustrative process 600 for generating natural language text using one or multiple semantic objects, in accordance with some embodiments of the technology described herein. The process 600 may be performed by any suitable natural language generation system and, for example, may be performed by NLG system 101 described with reference to FIGS. 1A-1D.

Process 600 begins at act 602, where the specification of a semantic object is obtained. The specification may specify data variables(s), attributes, a vocabulary, and a document structure configuration for the semantic object. For example, the specification may specify data variables(s) 154, attributes 152, vocabulary 156, and document structure configuration 158b (or document plan configuration 158 also including content selection configuration 158). The specification may include one or more other configurations, for example, an analysis configuration (e.g., analysis configuration 160), a micro-planning configuration (e.g., micro-planning configuration 162), and/or surface realization configuration (e.g., surface realization configuration 164). The specification may be obtained from any suitable source (e.g., semantic object data store 140, a configuration file or files, etc.). The specification may be in any suitable format. For example, the specification may be specified using a mark-up language such as YAML or any other suitable mark-up language including any other mark-up language described herein.

Next, at act 604, data related to the data variables of the semantic object may be accessed. These data may be accessed from any suitable source. In some embodiments, at least some of the data may be accessed from a system external the NLG system (e.g., business data store(s) 112 described with reference to FIG. 1). In other embodiments, at least some of the data may be provided to the NLG system in a configuration file, a function call, or in any other suitable way.

Next, at act 606, values for the data variable(s) of the semantic object are determined. In some embodiments, at least one or some of the values are the same as the values obtained at act 604, in which case at least one or some of the data attributes are simply take on the obtained values. Additionally or alternatively, one or more values may be derived (e.g., using an analysis configuration) from the data obtained at act 604, and at least one or some of the data variables take on values obtain as a result of such calculation(s).

Next, process 600 proceeds to act 610 during which a natural language text segment is generated using the semantic object whose specification was accessed during act 602, the data obtained at act 604, and the results of any calculations performed on these data at act 606. Act 610 includes multiple stages: (1) generating a first intermediate representation of the semantic object at act 612; (2) generating a second intermediate representation of the semantic object from the first intermediate representation of the semantic object using the vocabulary of the semantic object at act 614; and (3) generating a natural language text segment from the second intermediate representation of the semantic object. After the natural language text segment is generated at act 610, the natural language segment may be output at act 620 (e.g., for use by the NLG system to insert into a larger set of natural language text being generated, for example, a document; sent to a remote user, sent to a content management system, stored in non-transitory memory for subsequent access, etc.).

At act 610, the first intermediate representation of the semantic object is generated using its document structure configuration, values for data variables, and attributes (both data and lexical attributes). In particular, once a document structure configuration is identified (e.g., selected from multiple options) numeric values and/or lexical data may be substituted in for the attributes. Examples of this processing are described herein including with reference to FIG. 4A and 5A-5C.

At act 612, a second intermediate representation of semantic object is generated from the first intermediate representation using the vocabulary of semantic object. This processing corresponds to the lexicalization stage of natural language generation. In some embodiments, generating the second intermediate representation from the first intermediate representation comprises generating a structure (e.g., string) annotated with syntactic and/or morphological information. The lexicalization stage may be performed using any of numerous types of lexicalization techniques. In some embodiments, lexicalization may be performed using one or more grammars, for example, one or more abstract categorical grammars (ACGs), tree adjoining grammars (TAGs), context free grammars (CFGs), functional identification grammars (FIGs), any other suitable grammars, and/or in any other suitable way. Examples of this processing are described herein, including with reference to FIGS. 4E and 4G.

At act 614, natural language text is generated from the second intermediate representation obtained at act 612.

Various types of NLG processing may be performed at this stage including generation of referential and/or anaphoric expressions and the application of various surface realization transformations. These steps may be performed in accordance with configuration data in the semantic for those steps and/or using existing configurations of the NLG software tools being used to perform these steps. Examples of this processing are described herein including with reference to FIGS. 4H-4J.

It should be appreciated that process 600 is illustrative and that there are variations. For example, in some embodiments, process 600 may include one or more other processing stages in addition to or instead of the stages shown. For example, in some embodiments, an automatic aggregation stage may be included.

Additional Implementation Detail

Figure 7:
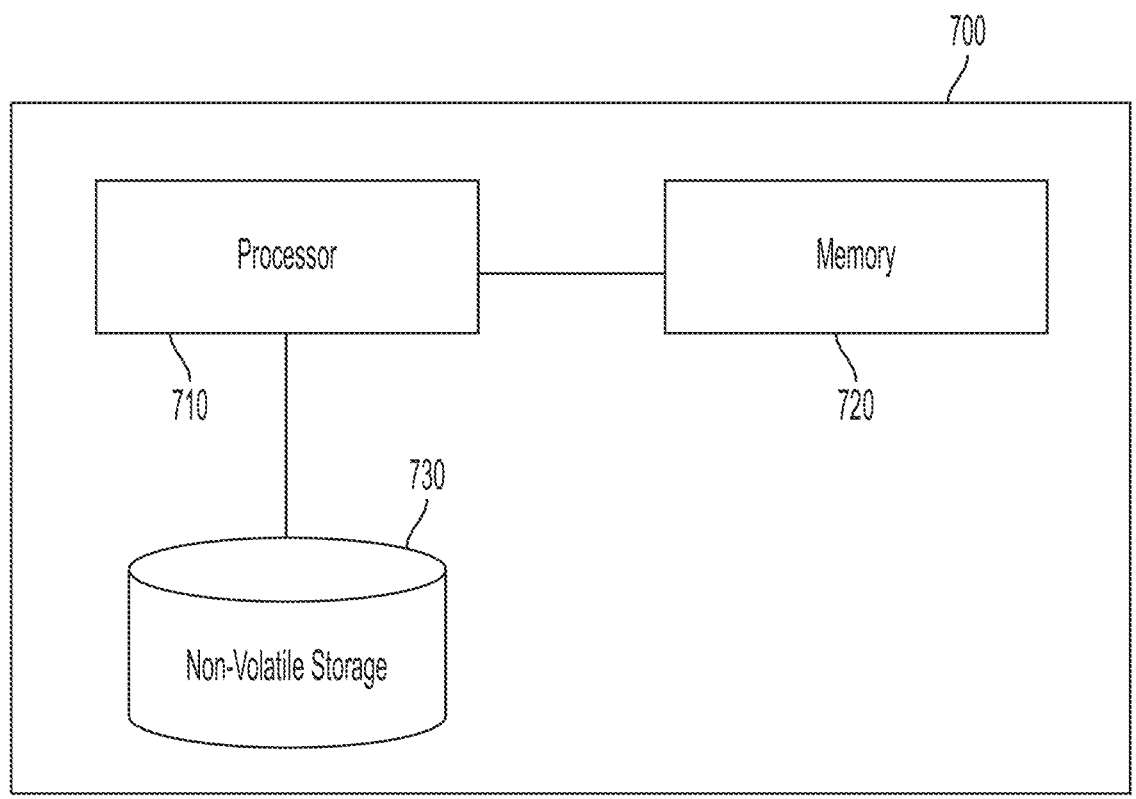
FIG. 7 is a block diagram of an illustrative computer system that may be used in implementing some embodiments of the technology described herein.

An illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor(s) 710 may control writing data to and reading data from the memory 720 and the non-volatile storage device 730 in any suitable manner, as the aspects of the technology described herein are not limited in this respect. To perform any of the functionality described herein, the processor(s) 710 may execute one or more processor-executable instructions stored in one or more non-transitory computer-readable storage media (e.g., the memory 720 ), which may serve as non-transitory computer-readable storage media storing processor-executable instructions for execution by the processor(s) 710.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIGS. 4A and 6. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for generating natural language text with a natural language generation (NLG) system using a plurality of semantic objects including a first semantic object, the NLG system communicatively coupled to at least one data store, the NLG system configured to generate natural language text using an NLG application, the NLG application comprising a semantic object access module, a database interface module, an NLG software library integration layer and one or more NLG software tools, the method comprising:
   executing the NLG application, using at least one computer hardware processor, to perform:
      using the semantic object access module, obtaining a first specification of the first semantic object from a semantic object data store, the first specification specifying a first set of one or more data variables of the first semantic object, first attributes of the first semantic object, a first vocabulary of the first semantic object, and a first document structure configuration of the first semantic object, wherein the semantic object data store comprises one or more storage devices storing data including the first specification of the first semantic object;
      using the database interface module, obtaining, from the at least one data store, first data related to the first set of one or more data variables of the first semantic object;
      determining values of at least some of the first set of one or more data variables using the first data obtained from the at least one data store;
      using the NLG software library integration layer, generating the natural language text including a first natural language text segment, using the first specification of the first semantic object, the values of at least some of the first set of one or more data variables, and the NLG system, at least in part by:
         generating a representation of the first semantic object using the first document structure configuration, the values of the first set of one or more data variables, the first attributes of the first semantic object and the first vocabulary of the first semantic object; and
         using the one or more NLG software tools, generating the first natural language text segment using the representation of the first semantic object;
      generating an electronic document including the generated natural language text; and
      transmitting the electronic document, over at least one communication network, to a user.

2. The method of claim 1, wherein the plurality of semantic objects includes a second semantic object, the method further comprising:
   obtaining a second specification of the second semantic object, the second specification specifying a second set of one or more data variables of the second semantic object, second attributes of the second semantic object, a second vocabulary of the second semantic object, and a second document structure configuration of the second semantic object;
   obtaining, from the at least one data store, second data related to the second set of data variables of the second semantic object; and
   determining values of at least some of the second set of one or more data variables using the second data obtained from the at least one data store.

3. The method of claim 2, wherein generating the natural language text comprises generating a second natural language text segment using the second specification of the second semantic object, and the values of at least some of the second set of one or more data variables.

4. The method of claim 3, wherein generating the second natural language text segment comprises:
   generating a representation of the second semantic object using the second document structure configuration, the values of the second set of one or more data variables, the second attributes of the second semantic object and the second vocabulary of the second semantic object; and
   generating the second natural language text segment using the representation of the second semantic object.

5. The method of claim 2, wherein generating the natural language text comprises generating a single sentence using the first specification of the first semantic object and the second specification of the second semantic object.

6. The method of claim 5, wherein generating the natural language text comprises:
   generating a representation of the second semantic object using the second document structure configuration, the values of the second set of one or more data variables, and the second attributes of the second semantic object;
   composing the representation of the first semantic object and the representation of the second semantic object to obtain a composed representation; and
   using the composed representation to generate the single sentence.

7. The method of claim 1, wherein the first document structure configuration for the first semantic objects specifies multiple document structures, wherein the method further comprises selecting from among the multiple document structures to obtain a selected document structure, and wherein generating the representation is performed using the selected document structure.

8. The method of claim 1, wherein the first specification of the first semantic object further specifies a first analysis configuration, and wherein determining the values of at least one of the first set of data variables comprises processing the first data obtained from the at least one data store using the first analysis configuration.

9. The method of claim 1, wherein the first specification of the first semantic object further comprises a content selection configuration indicating a subset of the first attributes to use for generating the natural language text, and wherein generating the representation of the first semantic object is performed using the content selection configuration.

10. The method of claim 1, wherein the first specification of the first semantic object further comprises a micro-planning configuration, and wherein the method further comprises:
applying automatic aggregation to the representation of the first semantic object using the micro-planning configuration.

11. The method of claim 1, wherein the first specification of the first semantic object further comprises a micro-planning configuration, and wherein the method further comprises:
applying referent generation to the representation of the first semantic object using the micro-planning configuration.

12. The method of claim 1, wherein the first specification of the first semantic object further comprises a surface transformation configuration, and wherein the method further comprises:
applying one or more surface transformations to the representation of the first semantic object using the surface transformation configuration.

13. The method of claim 1, wherein the at least one data store is external to the NLG system and the NLG system is communicatively coupled to the at least one data store using the at least one communication network.

14. The method of claim 1, wherein generating the natural language text comprises providing the natural language text to a publishing system external to the NLG system.

15. The method of claim 1, wherein the electronic document comprises a webpage.

16. A system, comprising:
at least one computer hardware processor; and
at least one non-transitory computer-readable storage medium storing processor executable instructions that, when executed by the at least one computer hardware processor, cause the at least one computer hardware processor to perform a method for generating natural language text with a natural language generation (NLG) system using a plurality of semantic objects including a first semantic object, the NLG system communicatively coupled to at least one data store, the NLG system configured to generate natural language text using an NLG application, the NLG application comprising a semantic object access module, a database interface module, an NLG software library integration layer and one or more NLG software tools, the method comprising:
using the semantic object access module, obtaining a first specification of the first semantic object from a semantic object data store, the first specification specifying a first set of one or more data variables of the first semantic object, first attributes of the first semantic object, a first vocabulary of the first semantic object, and a first document structure configuration of the first semantic object, wherein the semantic object data store comprises one or more storage devices storing data including the first specification of the first semantic object;
using the database interface module, obtaining, from the at least one data store, first data related to the first set of one or more data variables of the first semantic object;

determining values of at least some of the first set of one or more data variables using the first data obtained from the at least one data store;
using the NLG software library integration layer, generating natural language text including a first natural language text segment, using the first specification of the first semantic object, the values of at least some of the first set of one or more data variables, and the NLG system, at least in part by:
generating a representation of the first semantic object using the first document structure configuration, the values of the first set of one or more data variables, the first attributes of the first semantic object, and the first vocabulary of the first semantic object; and
using the one or more NLG software tools, generating the first natural language text segment using the representation of the first semantic object;
generating an electronic document including the generated natural language text; and
transmitting the electronic document, over at least one communication network, to a user.

17. The system of claim 16, wherein the first document structure configuration for the first semantic objects specifies multiple document structures, wherein the method further comprises selecting from among the multiple document structures to obtain a selected document structure, and wherein generating the representation is performed using the selected document structure.

18. At least one non-transitory computer-readable storage medium storing processor executable instructions that, when executed by at least one computer hardware processor, cause the at least one computer hardware processor to perform a method for generating natural language text with a natural language generation (NLG) system using a plurality of semantic objects including a first semantic object, the NLG system communicatively coupled to at least one data store, the NLG system configured to generate natural language text using an NLG application, the NLG application comprising a semantic object access module, a database interface module, an NLG software library integration layer and one or more NLG software tools, the method comprising:
using the semantic object access module, obtaining a first specification of the first semantic object from a semantic object data store, the first specification specifying a first set of one or more data variables of the first semantic object, first attributes of the first semantic object, a first vocabulary of the first semantic object, and a first document structure configuration of the first semantic object, wherein the semantic object data store comprises one or more storage devices storing data including the first specification of the first semantic object;
using the database interface module, obtaining, from the at least one data store, first data related to the first set of data variables of the first semantic object;
determining values of at least some of the first set of one or more data variables using the first data obtained from the at least one data store;
using the NLG software library integration layer, generating natural language text including a first natural language text segment, using the first specification of the first semantic object, the values of at least some of the first set of one or more data variables, and the NLG system, at least in part by:
generating a representation of the first semantic object using the first document structure configuration, the values of the first set of one or more data variables, the first attributes of the first semantic object, and the first vocabulary of the first semantic object; and using the one or more NLG software tools, generating the first natural language text segment using the representation of the first semantic object;

generating an electronic document including the generated natural language text; and transmitting the electronic document, over at least one communication network, to a user.

19. The at least one non-transitory computer-readable storage medium of claim 18, wherein the first document structure configuration for the first semantic objects specifies multiple document structures, wherein the method further comprises selecting from among the multiple document structures to obtain a selected document structure, and wherein generating the representation is performed using the selected document structure.

* * * * *

UNITED STATES PATENT AND TRADEMARK OFFICE
CERTIFICATE OF CORRECTION

PATENT NO. : 11,809,832 B2
APPLICATION NO. : 17/891047
DATED : November 7, 2023
INVENTOR(S) : Raphaël François André Salmon et al.

It is certified that error appears in the above-identified patent and that said Letters Patent is hereby corrected as shown below:

On the Title Page

Item (71) Applicant:
"Applicant: YSEOP SA, Lyons (FR)"
Should read:
--Applicant: YSEOP SA, Lyon (FR)--

Item (72) Inventors:
"Inventors: Raphael François André Salmon;
Lyons (FR); Alain Kaeser, Paris (FR);
Bernard Paul Remy Legaut, Bogota (CO)"
Should read:
--Inventors: Raphael François André Salmon;
Lyon (FR); Alain Kaeser, Paris (FR);
Bernard Paul Remy Legaut, Bogota (CO)--

Item (73) Assignee:
"Assignee: YSEOP SA, Lyons (FR)"
Should read:
--Assignee: YSEOP SA, Lyon (FR)--

Signed and Sealed this
Twenty-third Day of January, 2024

Katherine Kelly Vidal
*Director of the United States Patent and Trademark Office*